US012789083B2

(12) United States Patent
Dasher et al.

(10) Patent No.: US 12,789,083 B2
(45) Date of Patent: Nov. 10, 2026

(54) SYSTEMS AND METHODS FOR REPLAYING GAMES WITHIN A GAME ENVIRONMENT

(71) Applicant: Adeia Guides Inc., San Jose, CA (US)

(72) Inventors: Charles Dasher, Lawrenceville, GA (US); Christopher Phillips, Hartwell, GA (US)

(73) Assignee: Adeia Guides Inc., San Jose, CA (US)

( * ) Notice: Subject to any disclaimer, the term of this patent is extended or adjusted under 35 U.S.C. 154(b) by 430 days.

(21) Appl. No.: 18/241,109

(22) Filed: Aug. 31, 2023

(65) Prior Publication Data

US 2025/0073581 A1 Mar. 6, 2025

(51) Int. Cl.
*A63F 13/497* (2014.01)
*A63F 13/67* (2014.01)

(52) U.S. Cl.
CPC ............ *A63F 13/497* (2014.09); *A63F 13/67* (2014.09)

(58) Field of Classification Search
CPC ........ A63F 13/497; A63F 13/67; A63F 13/35; A63F 13/61; A63F 13/79; A63F 13/795; A63F 13/86; A63F 13/87
USPC .......................................................... 463/23
See application file for complete search history.

(56) References Cited

U.S. PATENT DOCUMENTS 6,024,643 A 2/2000 Begis
7,559,834 B1 7/2009 York
7,828,661 B1 * 11/2010 Fish ...................... A63F 13/795 709/204
7,955,175 B1 * 6/2011 Holloway ............... A63F 13/63 273/317.1
9,064,380 B2 6/2015 Yarbrough
10,737,180 B1 8/2020 Noland et al.
10,913,003 B2 2/2021 Miura et al.
10,940,393 B2 3/2021 Somers et al.
11,148,057 B2 10/2021 Ntoulas et al.
11,689,625 B1 6/2023 Phillips et al.
12,059,624 B2 * 8/2024 Osman .................. A63F 13/422
12,483,761 B2 * 11/2025 Ceresoli ............... H04N 21/472
2010/0178985 A1 * 7/2010 Chickering ............ A63F 13/10 463/42

(Continued)

OTHER PUBLICATIONS

"'Game Queue' Twitch Extension is Live!" Medium https://medium.com/pixels-gaming/game-queue-twitch-extension-is-live-87d4ab255b8d (2017).

(Continued)

*Primary Examiner* — Michael A Cuff
(74) *Attorney, Agent, or Firm* — HG LAW LLP

(57) ABSTRACT

Systems and methods for initiating gaming sessions with proxy non-player characters based on player characters through a social media platform. The systems and methods comprise detecting a first user has launched a gaming session on a gaming platform, generating a proxy user, broadcasting on a social media platform the gaming session for a plurality of users of the social media platform to join a proxy gaming session with the proxy user, receiving a request to join the proxy gaming session from a second user, the second user from the social media platform, and establishing the proxy gaming session with the second user and the proxy user on the gaming platform. Additionally, systems and methods may allow a user to replay past gaming sessions, e.g., on a gaming platform.

20 Claims, 22 Drawing Sheets

(56) References Cited

U.S. PATENT DOCUMENTS

| | | | | |
|---|---|---|---|---|
| 2012/0015746 | A1 | 1/2012 | Mooney et al. | |
| 2012/0064968 | A1 | 3/2012 | Youm et al. | |
| 2013/0079075 | A1 | 3/2013 | Osvald et al. | |
| 2013/0084985 | A1 | 4/2013 | Green et al. | |
| 2014/0235326 | A1 | 8/2014 | Paracha et al. | |
| 2014/0323226 | A1* | 10/2014 | Agrawal | A63F 13/332 463/42 |
| 2015/0004591 | A1* | 1/2015 | Lidey | G09B 7/08 434/351 |
| 2015/0126287 | A1* | 5/2015 | Chandranmenon | H04L 67/63 463/42 |
| 2015/0365489 | A1 | 12/2015 | Ann et al. | |
| 2015/0375101 | A1* | 12/2015 | George | A63F 13/497 463/24 |
| 2016/0001181 | A1 | 1/2016 | Marr et al. | |
| 2016/0228776 | A1 | 8/2016 | Miura et al. | |
| 2016/0279524 | A1 | 9/2016 | Shaw et al. | |
| 2018/0104587 | A1* | 4/2018 | Zachwieja | A63F 13/497 |
| 2018/0133595 | A1 | 5/2018 | Miller et al. | |
| 2018/0139301 | A1 | 5/2018 | Jaskiewicz et al. | |
| 2018/0243656 | A1* | 8/2018 | Aghdaie | A63F 13/67 |
| 2018/0361235 | A1 | 12/2018 | Hunter | |
| 2019/0091568 | A1* | 3/2019 | Oyama | A63F 13/35 |
| 2019/0134511 | A1* | 5/2019 | Degarmo | A63F 13/352 |
| 2020/0306638 | A1 | 10/2020 | Fear et al. | |
| 2020/0306643 | A1 | 10/2020 | Borovikov et al. | |
| 2021/0001229 | A1 | 1/2021 | Somers et al. | |
| 2021/0069597 | A1 | 3/2021 | Paquet | |
| 2021/0150854 | A1* | 5/2021 | Nguyen | G07F 17/3241 |
| 2021/0370163 | A1* | 12/2021 | Shiba | A63F 13/822 |
| 2021/0387089 | A1* | 12/2021 | McCoy | A63F 13/355 |
| 2023/0166183 | A1 | 6/2023 | Beltran et al. | |
| 2023/0362258 | A1 | 11/2023 | Phillips et al. | |
| 2024/0042313 | A1 | 2/2024 | Benedetto | |
| 2025/0073593 | A1 | 3/2025 | Dasher et al. | |

OTHER PUBLICATIONS

"Artificial intelligence in video games" Wikipedia https://en.wikipedia.org/wiki/Artificial_intelligence_in_video_games.

"Invite Friends to Play Games With You Via URL Sharing on Parsec" https://parsec.app/blog/link-sharing-for-gaming-over-the-internet-with-friends-e97769822373.

"Part 1: Key Concepts in RL—Spinning Up documentation" Openai https://spinningup.openai.com/en/latest/spinningup/rl_intro.html.

"Reinforcement learning" Wikipedia https://en.wikipedia.org/wiki/Reinforcement_learning.

"The Perfect Organism: The AI of Alien: Isolation" Gamedeveloper.com https://www.gamedeveloper.com/design/the-perfect-organism-the-ai-of-alien-isolation#close-modal.

"Using Alts as Companions in SWTOR" Reddit https://www.reddit.com/r/swtor/comments/d1g5hd/using_alts_as_companions_in_swtor/?rdt=48200.

Agarwal, "Top 25 Best Facebook Games that You Should Play" Beebom https://beebom.com/best-facebook-games/.

Dsouza, "AI in Gaming ,5 Biggest Innovations (+40 AI Games)" Engati https://www.engati.com/blog/ai-in-gaming#:%7E:text=Artificial%20intelligence%20in%20gaming%20allows,to%20stop%20playing%20the%20game (2021).

GeForce NOW "The Next Generation in Cloud Gaming" NVIDIA https://www.nvidia.com/en-us/geforce-now/.

Mackie, "Share a Link to Your Multiplayer World" https://educommunity.minecraft.net/hc/en-us/articles/360061379932-Share-a-Link-to-Your-Multiplayer-World (2023).

Twitch—https://www.twitch.tv/.

U.S. Appl. No. 18/241,106, filed Aug. 31, 2023, Charles Dasher.

* cited by examiner

SYSTEMS AND METHODS FOR REPLAYING GAMES WITHIN A GAME ENVIRONMENT

FIELD OF INVENTION

The present disclosure relates to sharing gaming experiences through a social media environment, and more particularly to, initiating gaming sessions with proxy non-player characters through a social media platform.

BACKGROUND

In the current landscape, video gaming and social media are largely separate experiences. Despite the popularity and widespread use of both, there is a lack of integration that would allow for seamless interaction between the two. Presently, games integrated within social media platforms are typically designed for fleeting, casual play, thereby often lacking the complexity and depth found in more sophisticated, standalone games. The inherent restrictions of operating within a web browser environment considerably limit their potential, resulting in a shortfall in providing an engaging experience that console, PC-based or XR-based games deliver.

This means that gamers who wish to share their gaming experiences with friends on social media are often limited to posting screenshots, sharing pre-recorded videos, or streaming their gameplay live. While these methods allow others to observe the gameplay, they do not provide an interactive experience or allow the viewers to directly participate in the game. Moreover, the replay-ability of shared gaming content is generally limited to watching the same video footage of the game. There is no feature that allows a viewer to engage with the game in a replayable mode where the game emulates the first user's style and skills.

Another significant issue is the lack of personalized gaming experiences in shared games. Existing systems primarily offer a one-size-fits-all experience, with little consideration for the player's skill level or personal gaming preferences.

SUMMARY

The present disclosure describes various embodiments and features. Some embodiments use artificial intelligence (AI) to create a model of a specific user or player (sometimes referred to as a "proxy user"). The model may be created using, for example, a reinforcement learning architecture of machine learning (ML). In some embodiments, that specific player may be modeled or emulated on a gaming platform, enabling numerous users to experience playing with the specific player (by way of the model or emulation) even when, for example, the specific player is not online or is busy in another gaming session. A Gaming platform is a certain combination of electronic or computer hardware created with the intention of hosting, playing, or displaying video games. For example, a Sony PlayStation®, Xbox®, Nintendo Switch®, or cloud-based gaming platform such as Nvidia's GeForce Now® and Sony's PS Now®, which offer remote game streaming as a service (GaaS). A social media platform may be any website, application, or infrastructure that enables internet-based communication between users of the platform. Depending on the embodiment, a social media platform may enable users to share content such as text, images, audio, or video.

Gaming sessions including one or more models, emulations, or proxy users may be referred to as "proxy gaming sessions." Such embodiments differ from approaches where, for example, AI models primarily govern non-player character (NPC) behaviors based on predefined rules or simpler learning algorithms. Further, such embodiments differ from an approach in which an AI gaming system may be pre-trained by gaming companies and, once trained, used to simply control NPCs to react to real players. In short, described techniques may be implemented to not only realistically model or emulate real users of video games (e.g., including their play styles, biases or tendencies, object or weapon choices, etc.), but to also enable quick-start gaming sessions for other users to play with or against such models by way of social media "portals" or prompts.

In view of the foregoing, the present disclosure provides a method for sharing gaming experiences through a social media platform. A social media platform may be any website, application, or infrastructure that enables internet-based communication between users of the platform. Depending on the embodiment, a social media platform may enable users to share content such as text, images, audio, or video. The method may comprise any one or more of the following: detecting a first user has launched a gaming session on a gaming platform, the first user having associated profile data, wherein the associated profile data comprises historic gaming data and social media profile data. For example, the associated profile data may comprise play styles of the user, skill level, game statistics, kill/death ratio, character choice of the proxy user profile, choice of language, playstyle, weapon choice, strategy choice, social media handles, usernames, verification badges, follower count, likes, comments, interactable features, or profile picture.

In addition, the method may further comprise generating a proxy user based on the associated profile data; broadcasting (or advertising) on the social media platform via the first user's social media profile the gaming session for a plurality of users of the social media platform to join a proxy gaming session with the proxy user; receiving a request to join the proxy gaming session with the proxy user from a second user, the second user from the social media platform; and establishing the proxy gaming session with the second user and the proxy user on the gaming platform.

Additionally, the present disclosure provides a method for replaying past gaming sessions on a gaming platform. The method may comprise any one or more of the following: receiving a request to replay a past gaming session from a first user; retrieving a participant list related to the past gaming session; identifying a plurality of users from the participant list; generating a plurality of proxy users based on associated profile data for each user, wherein the associated profile data comprises historic gaming data; and establishing the proxy gaming session with the first user and the plurality of proxy users on the gaming platform.

The method may further comprise inviting the plurality of users from the participant list to the proxy gaming session. In some examples, the plurality of proxy users are generated in response to an invited user not accepting the invite to the proxy gaming session before the start of the proxy gaming session.

In some examples, the proxy user is generated using a reinforcement learning algorithm based on historic gaming data. Reinforcement learning architectures have been found to be an efficient way of training the NPC model in the absence of existing player data.

In some examples, the method further comprises generating a proxy gaming profile for the proxy user.

In some examples, the method further comprises creating a cloud-based interface between the gaming platform and the social media platform; and associating the first user's gaming profile and social media profile.

In some examples, the method further comprises inputting, to the gaming platform, a plurality of user input commands for each proxy gaming profile for the gaming session; and transmitting the user input commands to the gaming platform.

In some examples, the method further comprises extracting hardware data from a first user computing device, the data comprising at least one or more of: console model, PC hardware capabilities, mobile device hardware capabilities, purchased games, or game data; transmitting the hardware data through the cloud-based interface to the social media platform; and filtering content on the social media platform based on the extracted data.

In some examples, the method further comprises displaying gaming profile data on the social media platform, the game profile data comprising one or more of: skill level, game statistics, hours played, platform of choice, kill/death ratio, character choice, or play style.

In some examples, the method further comprises extracting social media data from the first user's social media platform, the social media profile data comprising any one or more of: verification badges, follower count, likes, comments, interactable features, or profile picture; transmitting the social media data through the cloud-based interface to the gaming platform; and displaying the social media data on the gaming platform for the first user.

In some examples, the method further comprises monitoring, during a future gaming session, gameplay data of the first user; storing the gameplay data; and updating the proxy user based on the gameplay data.

In some examples, the associated profile data further comprises social media profile data. In some examples, the method further comprises prompting the first user to request to replay the past gaming session via a post on a social media platform.

In some examples, the method further comprises advertising on the social media platform via the first user's social media profile the gaming session for a plurality of users of the social media platform to join the proxy gaming session.

In some examples, the advertisement on the social media platform via the first user's social media profile comprises metadata required to participate in the proxy gaming session, the metadata comprising one or more of: the game title, save game data, purchased game data, game platform hardware required, or the gaming engine.

In some examples, the receiving a request to join the proxy gaming session from a second user, the second user from the social media platform.

In some examples, the method further comprises requesting feedback, from the second user, on the performance of the proxy user in the proxy gaming in session; and receiving the feedback on the performance of the proxy user from the second user.

In some examples, the method further comprises determining a social score of the closeness of the second user to the first user, wherein the social score is based on any one or more of: watch time, follow time, subscriber status, comments, likes, or direct message count; assigning a weighting to the feedback on the performance of the proxy user based on the social score; and updating the proxy user based on the weighted feedback.

In some examples, the method further comprises in response to the feedback of the performance of the proxy user, adjusting a difficulty level of the proxy user's gaming profile. In some examples, the adjusting of the difficulty of the proxy user improves at least one of: accuracy, decision making speed, or reaction time, of the proxy user. In some examples, the adjusting the difficulty of the proxy user does not change at least one of: playstyle, weapon choice, or strategy choice, of the proxy user.

In some examples, the method further comprises rewarding the first user and the second user for participation, wherein the reward is one or more of: badges, health, skins, game items, game currency, or XP boosts.

In some examples, the method further comprises recording voice data from the first user; extracting features from the voice data; and training a custom voice model to represent the first user's voice.

In some examples, the request to join the proxy gaming session from the second user is received after the proxy gaming session has started. In some examples, the method further comprising substituting the second user for a proxy user in the proxy gaming session.

In some examples, the method further comprises generating, with a natural language model, real-time gameplay commentary during the proxy gaming session; generating, with a custom voice model, a sound clip based on the gameplay commentary; and broadcasting, from the proxy user, the sound clip during the proxy gaming session. In some examples, the commentary discusses at least one or more of: play styles of the first user, skill level of players, game statistics of the proxy gaming session, kill/death ratio of the second user, kill/death ratio of the proxy user, character choice of the proxy user profile, insults, compliments, jokes, and strategies for playing with the proxy user.

In some examples, the method further comprises receiving a request to replay the proxy gaming session from the second user after the proxy gaming session has ended.

In some examples, the method further comprises replaying the proxy gaming session with the second user, and the proxy user.

In some examples, the proxy gaming session further comprises a plurality of other users, and the method further comprising any one or more of: generating a proxy user for each other user from the proxy gaming session; and replaying the proxy gaming session with the second user, and all proxy users.

In some examples, the method further comprises receiving a request to join the proxy gaming session with the proxy user from a third user, the third user from the social media platform.

In some examples, the method further comprises establishing a second proxy gaming session, in parallel to the first proxy gaming session, with the third user and the proxy user on the gaming platform.

In some examples, the method further comprises connecting the third user to the proxy gaming session with the second user and the proxy user on the gaming platform.

In some examples, the method further comprises, after the proxy gaming session with the second user and the proxy user on the gaming platform, detecting that the first user is in a match making mode; and prioritizing the second user to join the first user during the match making mode for a next gaming session.

In some examples, the advertisement on the social media platform via the first user's social media profile comprises metadata required to participate in the proxy gaming session, the metadata comprising one or more of: the game title, the console hardware required, or the gaming engine.

In some examples, the method further comprises generating input commands for the gaming session as the proxy user; and transmitting input commands to the gaming platform.

In another approach, there is provided a system for sharing gaming experiences through a social media platform comprising any one or more of: data storage and processing circuitry, the processing circuitry configured to execute computer-readable instructions that configure the computing system to: detect a first user has launched a gaming session on a gaming platform, the first user having associated profile data, wherein the associated profile data comprises historic gaming data and social media profile data; generate a proxy user with a model stored in the data storage based on the associated profile data; broadcast (or advertise) on the social media platform via the first user's social media profile the gaming session for a plurality of users of the social media platform to join a proxy gaming session with the proxy user; receive a request to join the proxy gaming session with the proxy user from a second user, the second user from the social media platform; and establish the proxy gaming session with the second user and the proxy user on the gaming platform.

In another approach, there is provided a system for replaying past gaming sessions on a gaming platform, the system comprising: data storage and processing circuitry, the processing circuitry configured to execute computer-readable instructions that configure the computing system to: receive a request to replay a past gaming session from a first user; retrieve a participant list related to the past gaming session; identify a plurality of users from the participant list; generate a plurality of proxy users based on associated profile data for each user, wherein the associated profile data comprises historic gaming data; and establish the proxy gaming session with the first user and the plurality of proxy users on the gaming platform.

In some examples, the system is one of a video game console system, a mobile phone, a tablet device, a cloud-based virtual machine, or a personal computer.

Systems and methods are defined for integrating gaming and social media to provide a dynamic, interactive, and personalized gaming experience that values social integration, and replayability. Unlike the current game-playing paradigm within social media today, this disclosure extends social media's role beyond simple browser-embedded games. The proposed system focuses on the use of social media as a tool for organizing and initiating gaming sessions on gaming consoles, mobile devices, virtual machines and PCs. This offers gamers a seamless integration of their gaming and social experiences, maintaining the depth of console and PC-based games while facilitating social interaction and coordination through popular social media platforms.

Additional advantages of the present disclosure allow for initiating gaming sessions with proxy non-player characters through a social media platform. In this way, when the game is shared and many more players playing with or against the proxy user, the NPC model is repetitively trained. The social sharing/viral aspects of the system enables the training of these player models which has not been possible prior to the present disclosure. This results in a proxy user that behaves similarly to the real player. This provides more personalized and immersive experience for other players.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1A:
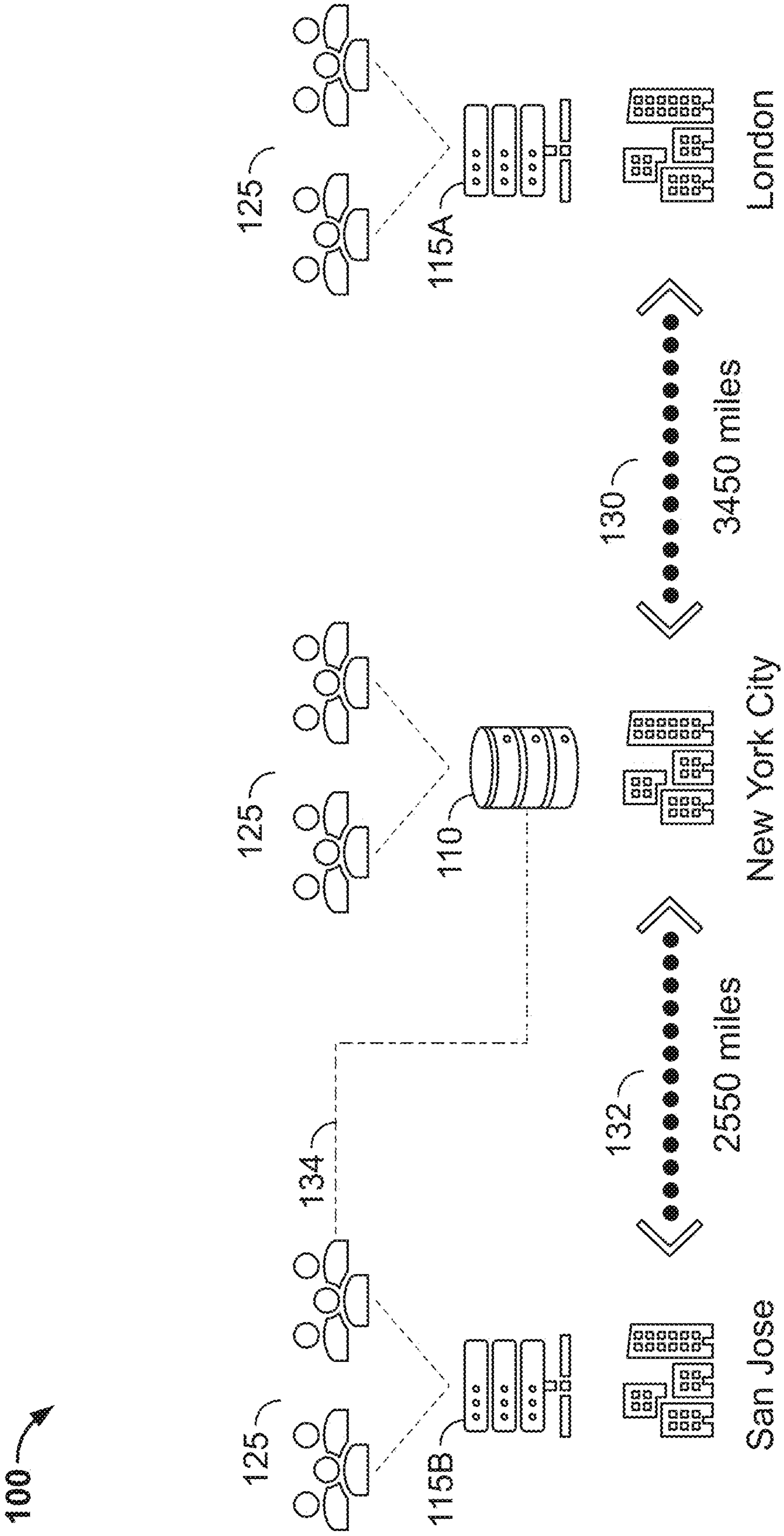
FIGS. 1A-1C show an illustrative block diagram of a system for deep social linking within a game environment, in accordance with some examples of the disclosure.

One option for integrating social media platforms and gaming platforms is to "embed" a video game within a platform such as Facebook or stream games using platforms such as Twitch®. However, games embedded in social media platforms often lack the depth and complexity of standalone games due to the constraints of running within a web browser environment. Streaming platforms such as Twitch®_allow for live streaming of gameplay, providing the social aspect of sharing gameplay experiences. However, these streams are simply recorded videos that lack interactive capabilities for the viewer beyond conventional video controls.

Video games may integrate ML and AI systems, which may enhance the game-playing experience. Some of the ways AI may be used in video games include:

- Behavior and Decision-making: where AI can be used to determine how NPCs (Non-Player Characters) interact with the player and the game world. For example, in a role-playing game, AI might be used to determine how an NPC reacts to the player's actions, whether they offer help or hostility, or the like;
- Pathfinding: where AI is used in games to allow NPCs to navigate the game world. This involves finding a path from one point to another while avoiding obstacles. A common algorithm used for pathfinding in games is the A* algorithm. Procedural Content Generation where AI can also be used to generate game content procedurally. This can include everything from creating entire game levels or maps to generating smaller pieces of content like loot drops or enemy spawns;
- Opponent AI in Strategy Games: where AI is used to control enemy factions or units in strategy games. This can involve making strategic decisions like where to attack or defend, when to build units or structures, and so forth; and
- Learning from Player Behavior: More advanced AI systems might even learn from the player's behavior and adapt to it. For example, in the game Alien: Isolation, the alien enemy learns from the player's actions and adapts its behavior accordingly, however, these are often present actions and cannot always react to the developing strategy (often referred to as "the meta") in gameplay.

One option for using AI systems is to use a neural network with logistic regression layers entitled. However, this is not the most efficient way to train an NPC "Ghost" or proxy user based on an actual player. Rather, using Reinforcement Learning (RL) to train a model of the player for use as the proxy user may be particularly suitable. Popular influencers such (e.g., famous gamers) could potentially have millions of "plays" against their proxy users. In some embodiments, disclosed systems use the reward and return functions to fine-tune the proxy user profile when trained over thousands or millions of plays, which results in a model that better represents a real player (e.g., including that player's tendencies, styles, etc.) than any other model.

The disclosed techniques can be implemented to address the lack of personalized gaming experiences in shared games. Existing systems often offer a one-size-fits-all experience, with little consideration for the player's skill level or personal gaming preferences. While there have been attempts to solve this problem by adjusting game parameters based on a player's skill level (e.g., more particularly by reducing game actions to words in order to feed into decision trees), these approaches fail to provide a holistic view of a player's abilities, preferences and other aspects which comprise the sum total of a player's "ability" or skill, thus reducing the solution to a simple decision tree.

Figure 1B:
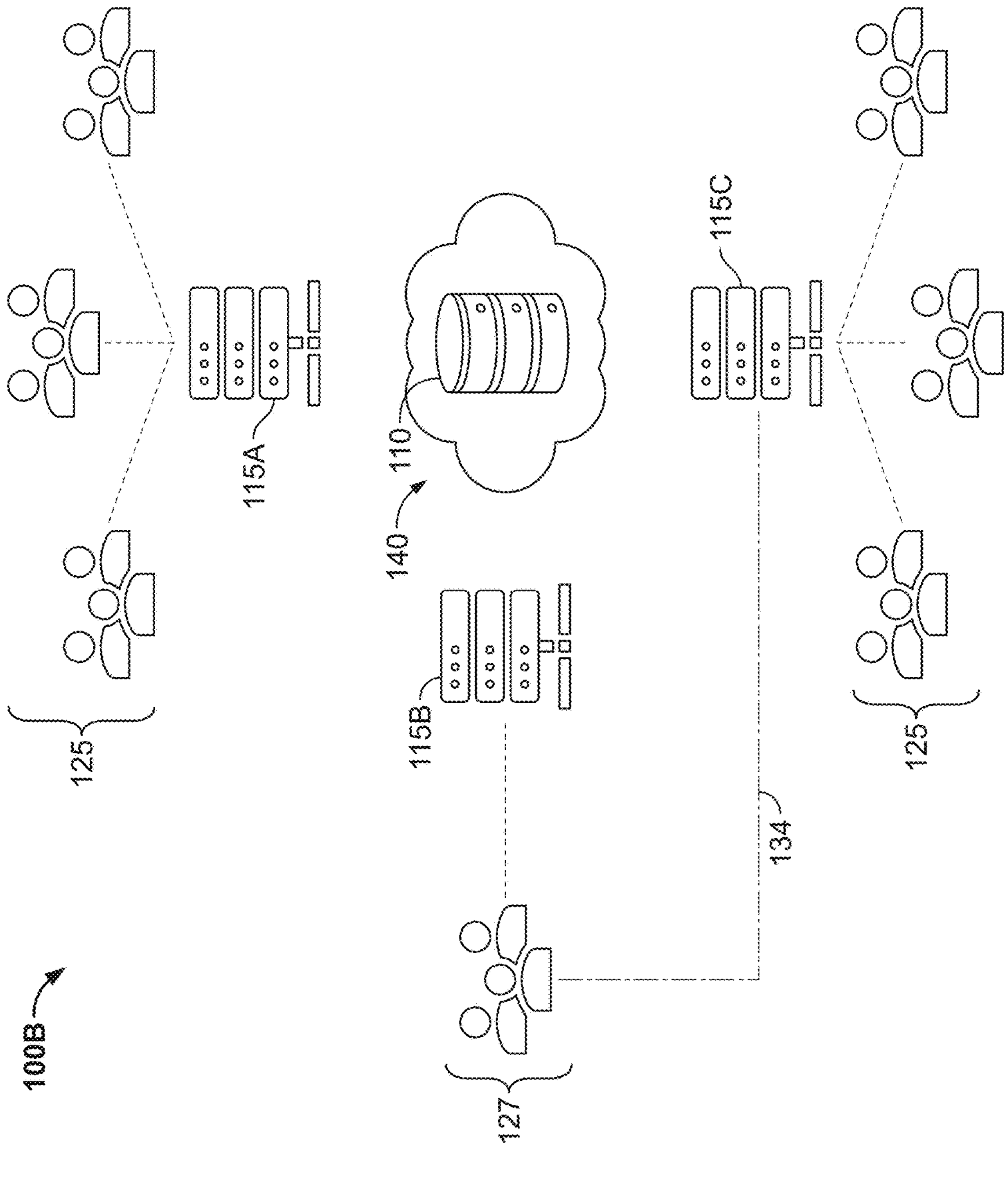
Figure 1C:
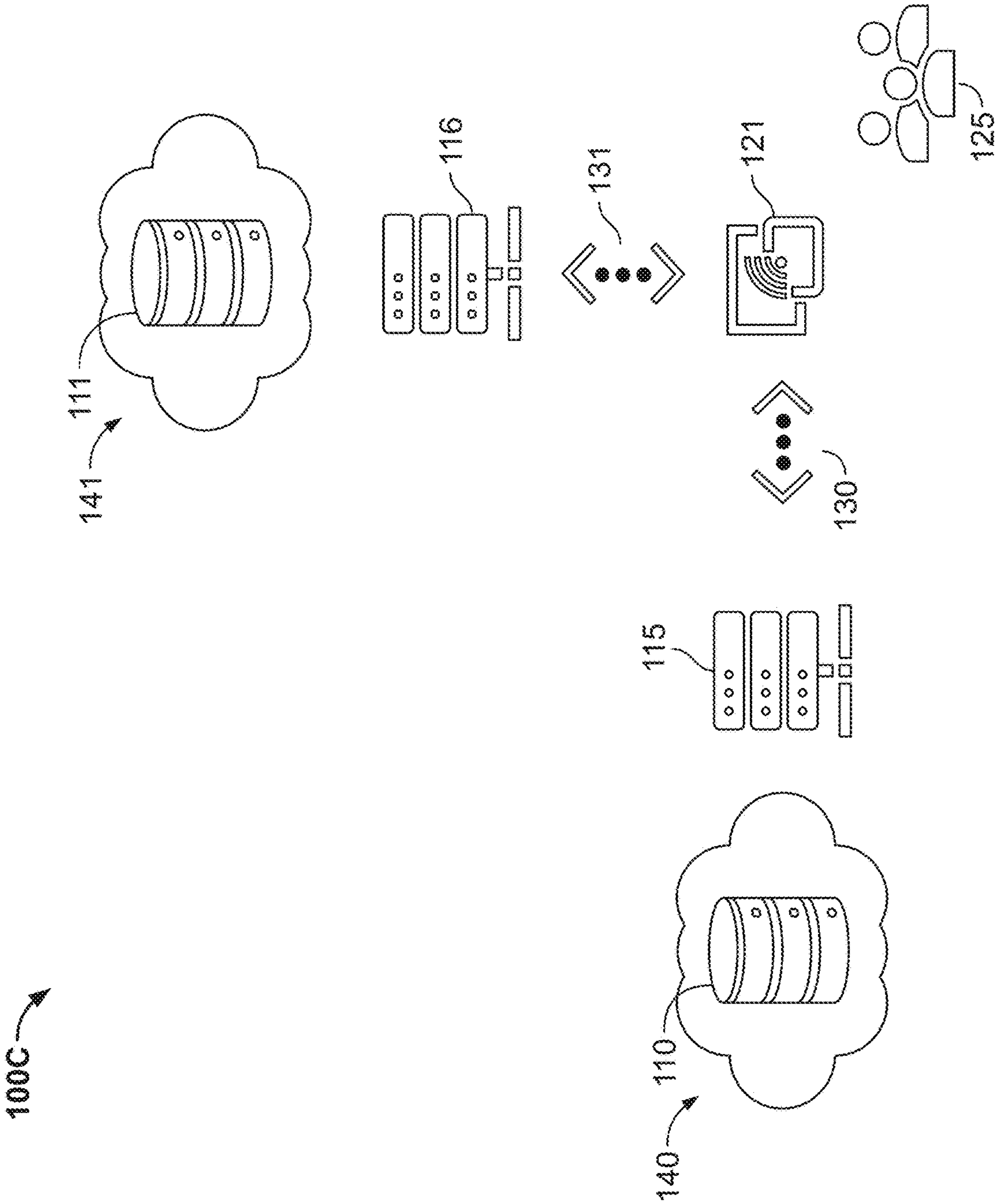

FIGS. 1A-1C show an illustrative block diagram of a system for deep social linking within a game environment, in accordance with some examples of the disclosure. Shown is a system 100, the system 100 may comprise parts that may be referred to as a cloud gaming delivery system, a content delivery system, a hyper-cloud provider, or an edge network, as will be explained in more detail below. Network 100 comprises a central server 110 and two satellite servers or "nodes" 115A, and 115B, although, in practice, there are typically 10s or 100s of satellite servers or nodes. In some examples, the central server 110, is the primary server for a content source, such as a media content item (e.g., a video game) for a cloud gaming platform, user profile data, and social media data. In some examples, the central server 110 may be located a considerable distance from the node servers. For example, as shown in FIG. 1A, the central server may be located in New York City and is connected to a first node server 115A hosted in, for example, London 3450 miles away via high-speed and low-latency data link 130 and to a second node server, 115B hosted in, for example, San Jose 2550 miles away via high-speed and low-latency data link 132. In some examples, the first and second node servers 115A, and 115B comprise a copy of the content of the central server 110, known as a local copy or version. In some examples, the central server 110 and the node servers 115A, and 115B comprise a plurality of compute units, graphical compute units, memory, and the like to provide cloud gaming services, as mentioned above. In some examples, the servers host virtual machines that users 125 connect to.

The servers 110, 115A and 115B can host virtual machines to provide different experiences to the users 125 with the creation of "ghost" players (i.e., proxy non-player characters based on real users) based on social media data, game data, and the like. The virtual machine may be configured based on a service level agreement of the users 125, the social media platform, or the game platform to provide an optimized gaming experience. For example, central server 110 may comprise computing units (e.g., processors or cores of a processor), graphical compute units, memory, and the like at varying clock speeds (e.g., 0.5-6 GHZ), a number of cores, memory interfaces (e.g., DDR5, DDR6, etc.), memory clock speeds (e.g., 5.0 Gbps), memory bandwidth (e.g., 80 GB/s). Each server 110, 115A-B, may have the same configuration or a different configuration based on the demographic of users 125 in that locality. The servers 110, 115A, and 115B are compatible with known real-time transport protocols (RTP), such as web real-time communication (WebRTC), and adaptive bitrate stream technologies (e.g., MPEG-DASH, Adobe HTTP Dynamic Streaming, Apple HTTP Live Streaming, Microsoft Smooth Streaming, QuavStreams Adaptive Streaming over HTTP, upLynk, CMAF, SCREAM, QUIC, or the like) to deliver the cloud gaming services. In particular, the system may select technologies that are low latency, such as WebRTC or SCREAM, which are adaptive bit rate technology's that are built on top of RTP/RTCP and are ideal for cloud gaming services. However, other technologies may be used for parts of the gaming services that do not require low-latency, such as, for example, cut scenes.

Each of central server 110, first node server 115A and second node server 115B provide the content stored thereon to a plurality of users 125. In some examples, it is the users' computing devices or gaming applications that are connected to the servers. Said gaming applications support real-time protocols (RTPs), e.g. WebRTC, and communicate to the servers so that the users 125 can request others to join their games through the social media platform, initiate game sessions, or, for example, make changes to their current gaming experience, before, during, or after a request to establish a session of gameplay. Typically, the plurality of users 125 connect to the nearest geographical server in the first instance, as this usually results in the lowest ping, latency and jitter between the user and the server, however, a request to join a game session may only be achievable on a more distant server due to congestion, bandwidth limitations, or capabilities of the local server. In some examples, the request involves moving the users' 125 connection to the nearest geographical server to improve on ping, latency, jitter or the like.

In some exemplary situations, there is provided a method for establishing a session of gameplay in cloud computing system 100. The method comprises receiving a request to establish a session of gameplay on a user device. For example, the user 125 may select a video game to play that is hosted on a cloud computing server 100. The method further comprises retrieving a user profile associated with a user 125 of the user device, wherein the user profile identifies gaming data and social media profile data. The gaming data and social media profile data is representative of the content the user can access on central server 110 or secondary servers 115A-B and the social media credentials (e.g., APIs, access keys, passwords, user names, profile pictures, handles, follower count, likes, etc), to enable the servers to provide and/or retrieve content from the social media platform with the user's social media profile. In some examples, the method further comprises establishing the session of gameplay based on the identified user profile data and advertising the session of gameplay on the user's social media platform with the user's social media data, by, for example, posting on the social media platform as the user via their social media account. For example, the user may have pre-authorized the system to post on their social media profile and retrieve social media platform data, to enable the system to advertise the user's session of gameplay on the social media platform and enable other users of the social media platform to join a particular video game with a proxy user gaming profile of the first user.

Accordingly, in some examples, the method comprises receiving a request to join a proxy gaming session with a proxy user gaming profile based on a first user from the social media platform. The system establishes the proxy gaming session with the user from the social media platform, and a proxy user based on the user's 125 gaming profile and/or social media data.

In some examples, the proxy user is generated with a reinforcement learning algorithm. Reinforcement learning (RL) is an area of machine learning concerned with how intelligent agents ought to take actions in an environment in order to maximize the notion of cumulative reward. Reinforcement learning is one of three basic machine learning paradigms, alongside supervised learning and unsupervised learning. Reinforcement learning differs from supervised learning in not needing labelled input/output pairs to be presented, and in not needing sub-optimal actions to be explicitly corrected. Instead, the focus is on finding a balance between exploration (of uncharted territory) and exploitation (of current knowledge). The main difference between the classical dynamic programming methods and reinforcement learning algorithms is that the latter do not assume knowledge of an exact mathematical model of a markov decision process (MDP) and they target large MDPs where exact methods become infeasible; such as in the present gaming environment. In these examples, the maximized cumulative reward, FIG. 1B illustrates another exemplary system 100B, in accordance with some embodiments of the disclosure. Shown is a cloud computing system 100B comprising a central server 110 hosted in the cloud 140. The central server 110 is connected to three satellite servers or nodes 115A, 115B and 115C. A plurality of users 125 and 127 are connected to the nodes 115A, 115B, or 115C and are receiving multimedia content, such as video game content. As shown in FIG. 1B, the users 127 are also connected to node 115C via connection 134. Connection 134 is shown to illustrate, in some examples, that establishing the session of gameplay comprises establishing, over a network, a peer-to-peer connection between a streaming server (e.g., server 115C) and the user device. For example, user 127 may be connected to server 115B, however, after receiving a request to join a game session, server 115B hands off the connection to a server better suited to meet the request. In some examples, the method further comprises transmitting, over the peer-to-peer connection from the streaming server 115C to the client device/user 127, gameplay video and audio generated from the session of gameplay. In some examples, the peer-to-peer connection is a real-time protocol connection, such as web real-time communication (WebRTC) or the like. An appropriate server or apparatus can be utilized to perform the methods herein.

FIG. 1C illustrates another exemplary cloud computing system 100C, in accordance with some embodiments of the disclosure. Shown is a cloud computing system 100C comprising a first central server 110 hosted in the first cloud 140. The first central server 110 is connected to a first satellite server or node 115, which is in turn connected to a user device 121 via a first data connection 130. The first central server 110 is associated with the first provider's platform, e.g., a gaming platform. The content delivery network 100C also comprises a second central server 111 hosted in the second cloud 141. The second central server 111 is connected to a second satellite server or node 116, which is in turn connected to a user device 121 via a second data connection 131. The second central server 111 is associated with the second provider's platform, e.g., a social media platform.

In some examples, the method further comprises creating an interface between the gaming platform and the social media platform. In some examples, the method also further comprises linking the user's 125 gaming profile and social media profile. For example, an application programming interface (API) for two or more computer programs to communicate with each other may be previous established and used to the link the user's gaming and social media profiles.

The methods and systems described herein apply to user device 121 and one or more servers such as first and second central server 110 or 111, which may be a computing device (shown in more detail in FIGS. 2, 3, 16, and 17). In some examples, the user device is a personal computer (PC), a home gateway, a smart appliance (such as a smart TV), a smartphone, laptop, or tablet. The user device 121 is configured to receive multimedia content (e.g., gaming content) from either the first central server 110 or second central server 111 via first node 115 or second node 116; and is further configured to receive user inputs. In some examples, the first and second central servers 110 and 111 comprise the same or similar versions (copies) of media content requested by device 121. For example, each server or node may have a cached copy of the game "Call of Duty." In some examples, the method further comprises extracting data from the user 125 computing device. For example, the data may comprise at least one or more of: console model, hardware capabilities, purchased games, and game data; and such data is transmitted to the social media network.

For clarity, "Gameplay" is often described as the specific way in which players interact with a game, and in particular with video games. Gameplay is often used to describe the pattern defined through the game rules, connection between player and the game, challenges and overcoming them, plot and player's connection with it. Gameplay is also used herein to refer to the graphics and audio elements of a video game, as well as the user's ability to interact with a video game.

"Gameplay" may be broken down into three types of rules that govern the manner of interaction between player and game: "Manipulation rules", defining what the player can do in the game; "Goal Rules", defining the goal of the game; and "Metarules", defining how a game can be tuned or modified; this application focuses on the latter. In video games, gameplay can be divided into several types. For example, cooperative gameplay involves two or more players playing on a team. Another example is twitch-gameplay which is based on testing a player's reaction times and precision, for example in rhythm games or first-person shooters.

Another example of gameplay includes, but is not limited to, asymmetrical multiplayer in which players can have significantly different roles or abilities from each other-enough to provide a significantly different experience of the game, this can refer to metarules also. In games with light asymmetry, the players share some of the same basic mechanics (such as movement and death), yet have different roles in the game; this is a common feature of the multiplayer online battle arena (MOBA) genre such as League of Legends and DOTA 2, and in hero shooters such as Overwatch and Apex Legends. In games with stronger elements of asymmetry, one player/team may have one gameplay experience (or be in softly asymmetric roles) while the other player or team play in a drastically different way, with different mechanics, a different type of objective, or both. Examples of games with strong asymmetry include Dead by Daylight, Evolve, and Left 4 Dead Asynchronous multiplayer is a form of multiplayer gameplay where players do not have to be playing at the same time. This form of the multiplayer game has its origins in play-by-mail games, where players would send their moves through postal mail to a game master, who then would compile and send out results for the next turn. Play-by-mail games transitioned to electronic form play-by-email games. These types of asynchronous multiplayer games waned with the widespread availability of the Internet which allowed players to play against each other simultaneously but remains an option in many strategy-related games, such as the Civilization series. Coordination of turns is subsequently managed by one computer or a centralized server; often this genre of games is bottlenecked by computer processing power rather than graphical processing power. Therefore, this is an example of the type of video game that available upgrades would be applied to all users within the session (e.g., one user has a service level agreement for more compute units, which applies to the Asynchronous multiplayer game, and therefore all users benefit form the additional compute resource).

Cooperative video gameplay, often abbreviated as co-op, is a video game that allows players to work together as teammates, usually against one or more non-player character opponents, known as player versus environment (PvE). It is distinct from other multiplayer modes, such as competitive multiplayer modes like player versus player (PvP). In its most simple form, cooperative gameplay modifies the single player mode of a game, sometimes with broader modifications to the story and gameplay. Co-op games can be played over a network via a local area networks or wide area networks, such as in the Destiny and Borderlands series, while other co-op games can be played locally using one or multiple input controllers, with It Takes Two as an example. Some games such as Mario Kart Wii and Call of Duty's co-op modes allow two players from the same console to play with others online. Co-op gameplay has been gaining popularity in video games in recent years, as controller and networking technology has developed. On PCs and consoles, cooperative games have become increasingly common, and many genres of game-including shooter games, sports games, real-time strategy games, and massively multiplayer online games-include co-op modes.

Over-the-top services, OTT, have increased in popularity significantly since broadband level internet speeds and bandwidths have become ubiquitous. For example, adaptive streaming is fast becoming the most widely used method for video delivery to end-users over the internet. Cloud gaming is an emerging market, with the likes of Nvidia's GeForce Now® and Sony's PS Now®, which offer remote game streaming as a service (GaaS). Cloud gaming often doesn't require the user to download and install the game, simply subscribe to a service and obtain a license to play the game, or the like. The user's inputs to the game are streamed from the user to the server hosting the game, and the video and sound output from the game are sent to the user. These systems are considered within the scope of this disclosure, and the methods herein apply to such systems as equally as hardware, (e.g., device 121).

The video and sound may be streamed via conventional adaptive streaming technologies. Adaptive bitrate streaming is a method of video streaming over the internet where the source content is encoded at multiple bit rates, each of the different bit rate streams is segmented into small multi-second parts, however, for live-streaming, in particular cloud gaming, the emphasis is typically on reducing lag or latency, as such, RTP is preferred.

Figure 2:
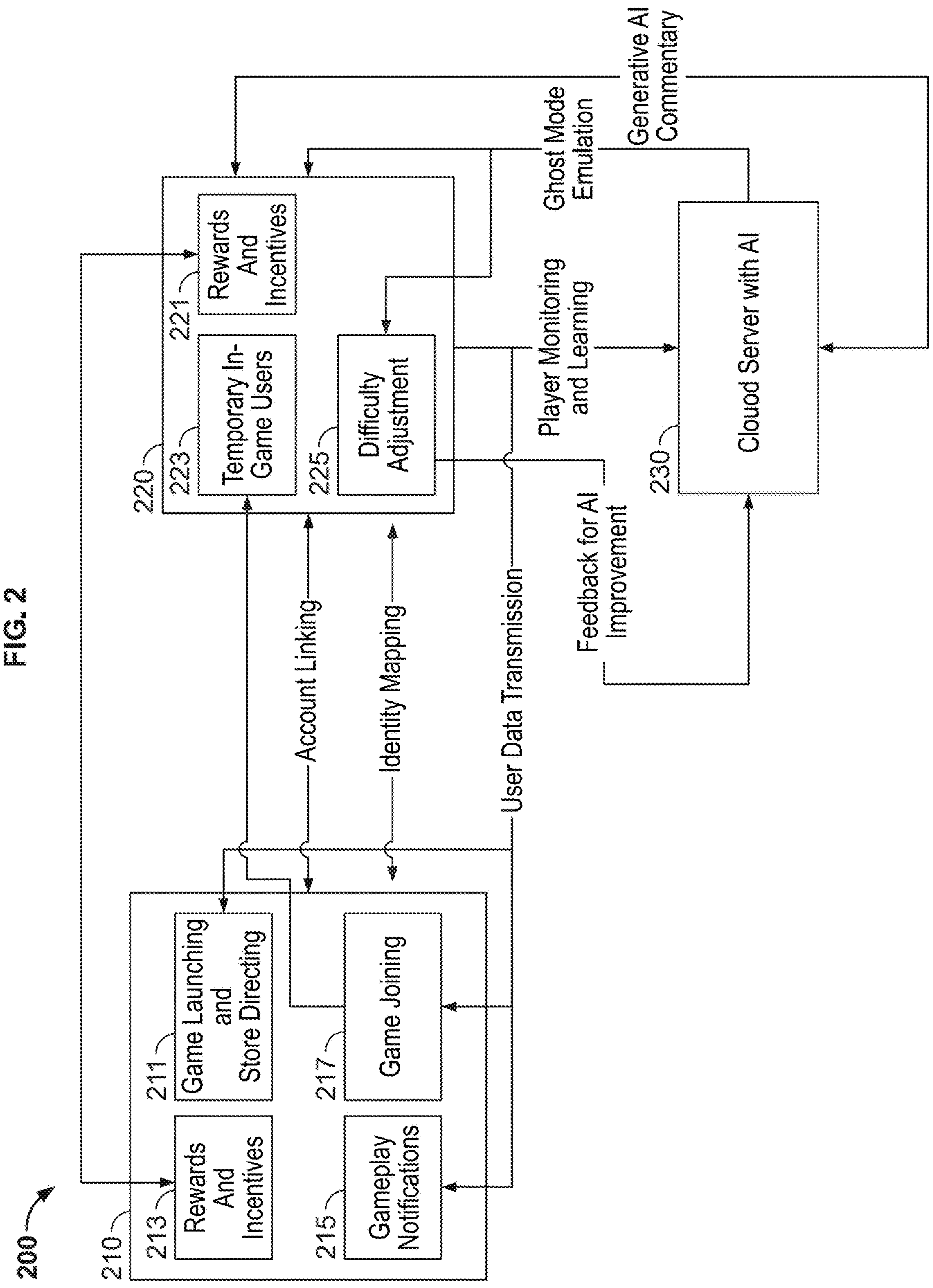
FIG. 2 is an illustrative block diagram of a system for deep social linking within a game environment, in accordance with some examples of the disclosure.

FIG. 2 is an illustrative block diagram of a system for deep social linking within a game environment, in accordance with some examples of the disclosure. The system 200 links a gaming platform 220 and social media platform 210. The system 200 facilitates the sharing of a live video game onto a social media platform 210. In addition, system 200 enables the direct participation of social media users 127 (see FIG. 1A-1C) in the live game, not as mere spectators, but as interactive players, thus extending the boundaries of the gaming session even beyond the end of a live game. Either ahead of time or during a live game the user (previously having linked their social media account(s)) may choose to "share" the game experience with their social media network.

Some examples of systems that address game sharing are:

A list manager plugin. A list manager plugin is typically used on live streaming platforms. This plugin uses a chatbot manager to act as a gatekeeper for viewers asking to "join" a game (where the user may respond to a request with a post with instructions to join the game such as by entering a special code or searching for a certain game identifier specified in the response by the user);

World hosting. In some systems, users create "worlds" which run on various servers. Anyone with a link to the "world" may join and participate in the world. These systems do not require users to pass credentials or "own" the game; and Co-operative play (co-op). Co-op can be where two or more players are playing in the same room on the same gaming console (playing a non-networked game like PacMan on a 1980s Atari 2600). Co-op may also be where game controls are "tunneled" over the Internet so that remote players can play as if they were both in the same room.

However, some embodiments are not simply about sharing access to a game or forwarding of controller data. While these examples discuss joining and playing games, the present disclosure goes further by sharing access to a game where the actual "share" may be altered based upon a number of different factors such as users linking consoles to their social media accounts, owning a game, owning a mobile version of a game, etc. as well as encapsulating the user experience within a social media application and preserving the user's social media profile, status, badges and data (like total number of followers). For example, if a follower on Twitter is a subscriber to an account vs just a regular follower, they may have a priority to be able to "join" a live game or play a ghost version before non-subscribers.

For example, a user who is known on the social media platform 210 may choose to share a game he is playing, either alone or with a group of friends. When he shares the "game" post on the social media platform 210, the game platform 220 provides the connection information necessary for others to join him in a multiplayer experience. For example, the data (which may be hidden within the post metadata) may include data such as the game title, the console hardware required, or the gaming engine required. In particular, the user's social media username (also known as a "handle") may not be the same as the game platform's 220 username. For example, a Twitter user's handle may be, @Elonmusk, whereas their game console username (e.g., "Xbox gamer tag") is em_1234. When a user or user(s) choose to join the game from within the social media platform 210, the system could generate a notification which is sent to the user's game console or game platform 220 asking if they wish to join the game. If they choose to join the game, a "temporary" account is created for them for use during the gaming session. The account name, profile etc. are provided by the social media platform with player name and badges (such as verification badges) mapped from the social media platform.

Each participant corresponds to a 'temporary' profile within the game, also referred to as a proxy user, with player names and badges accurately mapped from the social media platform. The same process occurs for other players who wish to join the game. When enough players have joined, the game begins. Elon and other users play the game as normal. Within the game experience, a user would see Elon's character, his player's name would be @ElonMusk and his badges are that he is a verified Twitter employee. While the game is in progress, a selection to join from the post may indicate that the maximum number of players has been met and the user can choose to watch a stream of the game as it is being played live. In this way, the system takes the appropriate action from a single click to "join the game" from within the social media post based on the current state (in this case the maximum number of allowed players has been reached) and automatically switches to a live stream of the game in progress).

During gameplay, a cloud server 230 using AI/Machine Learning (ML) algorithms monitors users' gameplay. For example, @Elonmusk's gameplay is monitored and analyzed by the ML to create a model of @Elonmusk's gameplay abilities, his preferences within the game such as character choice, weapon choice if applicable, special button combinations he uses, etc.

Once the game is complete, participants may be asked to review the video or audio of the game to "edit" or remove any unwanted speech or content before others are able to stream the game or join a ghost version of the game (during this time, the post could indicate that the game is being processed). AI could be used to detect content such as spoken words that may be undesirable and request approval to include that portion of the audio from the first users).

Once the system has enabled the post, other users who select to join from the post are given the option of watching the recorded version of the game (as is known in the art) or the option to join a new game with one or more players emulated. In this case if a user chooses to play in this "ghost mode", at least one of the Non-playable Characters (NPCs) is an emulation of Elon Musk. The user emulation runs in the cloud, which is also running an instance of the console, phone, tablet, or computer VM along with the game title and would seem like any other player in a multiplayer game. This emulated player instance may be receiving the rendered video of the game and emulating the controller input back to the game instance. The NPC Elon would show his username, badges etc. just like it did when the real game was played. Audio captured during an original game (if allowed by a user privacy preference) could be replayed if the AI/ML system determined that it was associated with an action within the original game such as Elon saying "I got him" when engaging the enemy. In the case where multiple NPCs are present, the user may have the choice to limit the number of original NPCs, for example if the user wants to play solo with or against ghost Elon or if the player wants to allow other users to join the ghost game (Imagine the posts of people playing against or with Elon's NPC and posting the videos to their social media).

The system will determine Elon's playing ability using machine learning algorithms and provide a scale of ability back to the social media network. In this way, the post of the game (which allows users to watch or play in ghost mode) could have an indicator on how difficult the game play will be. Additionally, a user may be able to adjust the game play ability of NPC Elon either from within the join experience (from within the social media post) or within their gaming console or gaming engine. For example, there may be a user setting to always use the lowest or highest ability or to allow the post metadata to determine the difficulty level.

Additionally, the system could provide feedback (for example via a poll on the social media network) allowing users to rate the accuracy of the NPC emulation. In some examples, the feedback is sent to the game engine, game console, or a cloud system for additional AI model fine tuning. In some examples, the system offers rewards or cross platform advertising and the system displays the same advertisement or another advertisement for the same product within the game. In some examples, rewards are bi-directional, for example a high number or increase in social media friends of followers may provide a user's character with a health boost within the game. A high score or winning streak may enable a badge on the user's social media profile.

In some examples, feedback may only be requested from players (i.e., the second user) that can accurately rate the proxy user's performances vs the first user that the proxy user is based on. For example, if the second user has experience playing with the first user, then the second user may be marked as eligible to provide feedback and/or rate the accuracy of the proxy user, as they will be able to provide feedback based on past experiences.

Alternatively, in some examples, rather than selecting eligible players to provide feedback, additional weighting can be given to the feedback provided by players with real world experience. For example, a social score between the first user and the second user is determined to provide additional weighting to the feedback provided by the second user regarding the proxy user's performance. The social score is a reflection of the closeness of the second user to the first user, therefore it is advantageous to calculate the social score is based on one or more of: watch time (WT), follow time (FT), playtime (PT), subscriber status (SS), comment count (CC), like count (LC), or direct message count (DMC). For example, the second user may be a viewer of the first user's streaming channel, therefore a non-personal relationship can be assumed and watch-time, subscriber status, and the like will be the primary factors in their social score, which will be reflected in their feedback regarding the proxy user by a medium weighting. However, the first user may be a friend of the second user, and the second user may have 400 hours in a game with the first user, their social score will be high, which will be reflected in their feedback regarding the proxy user by a high weighting. Lastly, the first user and second user may have no relationship at all, their social score will be low, which will be reflected in their feedback regarding the proxy user by a low weighting.

The social score may be calculated as an aggregate of the ratio to the mean of any one or more of the metrics as described above . . . for example:

$$\frac{1}{\text{social score}} = \left[\frac{\overline{WT}}{WT_2}\right] + \left[\frac{\overline{FT}}{FT_2}\right] + \left[\frac{\overline{SS}}{SS_2}\right] + \left[\frac{\overline{CC}}{CC_2}\right] + \left[\frac{\overline{LC}}{LC_2}\right] + \left[\frac{\overline{DMC}}{DMC_2}\right] + \left[\frac{PT_1 - PT_2}{PT_1}\right] \ldots$$

In this way, the average measure of all users, is measured against the second user's measure. E.g., if the watch time for the first user's stream is an average of 200 hours for a user, and the second user has 100 hours-they are below average and therefore the weighting will be low. E.g., if the average DM count between a user and the first user is 20, and the second user has 60 DMs-they are above average and therefore the weighting will be high. In some examples, all measures can be used, or any one or more of these measures can be used.

By way of example, if the first user has a play time $PT_1$ in the game of 250 hours; and a second user has a playtime in the game with the first user of 200 hours, the system may determine the social score as:

$$\frac{1}{\text{social score}} = \frac{250 - 200}{250} = 0.2$$

This yields a social score of 5, meaning that the weighting for any feedback given by the user is increased by 5 times (5×).

Figure 3:
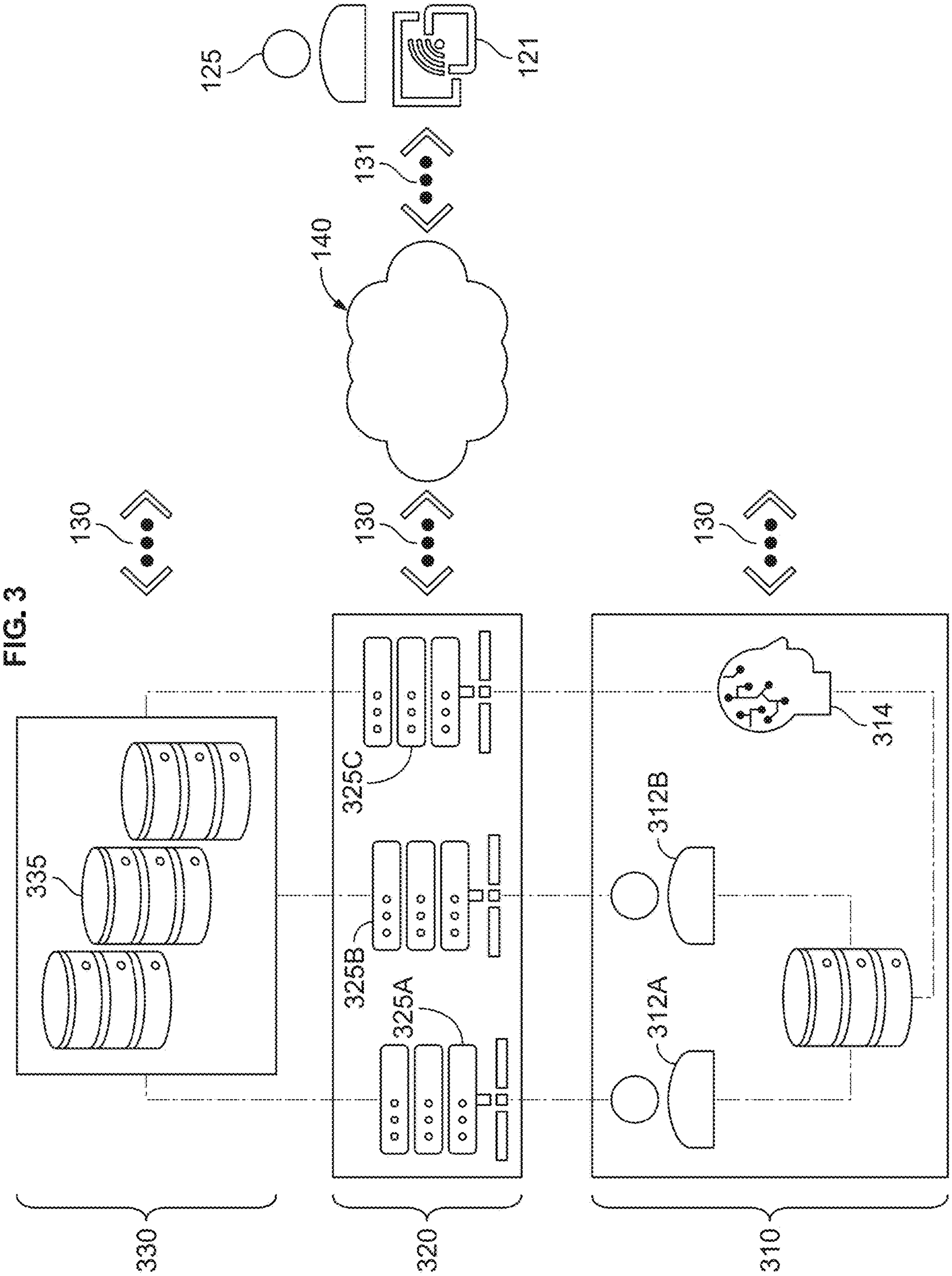
FIG. 3 depicts an illustrative block diagram of a system for playing against emulated players, in accordance with some examples of the disclosure.

FIG. 3 depicts an illustrative block diagram of a system for playing against emulated players, in accordance with some examples of the disclosure. This system covers both local running games on game consoles, PCs, phones, tablets and XR systems in a multiplayer environment and it also supports emulation in cloud gaming from any type of hardware/platforms that supports remote rendered cloud gaming. This system can leverage multiplayer game servers today. The emulated players are playing the game sending controller data to the game server and receiving game data from the cloud game session.

As mentioned previously, one option is to use models based on Neural Networks which is not the most efficient way of training the NPC and relies heavily on pre trained "base layers" which are very expensive computationally with additional Logistic Regression Layers trained on gameplay. These models will always be biased toward their original "base" model in the absence of lots of training epochs. The method in this disclosure, which is based on Reinforcement Learning algorithms requires no pre-existing base model. This model is then trained whenever the first user plays the game again. This training may be in a live or historical multiplayer gaming session with or without proxy user mode enabled or a single-player gaming session with emulated AI bots. Additionally, when the game is shared and many more players play with or against the proxy user version, the NPC model is repetitively trained. The social sharing/viral aspects of the system enable the training of these player models which has never been possible before. This results in a 'ghost' player, or proxy user, that behaves similarly to the real player. This provides a more personalized and immersive experience for other players.

Multiplayer functionality and the ability to invite other players to a live game are also widespread features in modern gaming, offered by various game developers and console manufacturers. However, these systems typically operate within the confines of the gaming platform or gaming service and do not offer seamless integration with social media platforms as in the present disclosure. In particular, in some examples, it is the proxy user, or rather a temporary gaming profile set-up for the proxy user, that sends an invite through the gaming platform to the second user. In this way, from the point of the second user, they will have received an invite from "@elonmusk" rather than a temporary/randomly generated username or handle such as "@player1993". Furthermore, from the point of view of the gaming platform, no adaptations are needed for the present disclosures to take effect, the proxy user, as far as the gaming platform has visibility, interacts with the platform as real user would. Even more so as, in some examples, a cloud-based system provides controller inputs as the proxy user into the gaming platform.

Unlike simple streaming (video streaming of live games), the present disclosure enables the sharing of live video games which may be joined when they are in progress directly from a social media post and enables social media users to join and participate in a unique "ghost mode". In this "ghost mode", a Non-Player Character (NPC) emulates the original post sharing players style and skill, derived from machine learning algorithms (AI) tracking the player's gameplay. By utilizing an AI engine capable of learning and replicating a player's style, skill, weapons of choice, specific attack moves of choice, etc., it becomes possible to recreate past versions of a player. These social media posts may be memory posts (Facebook) from a multiplayer gaming session with friends back in time. These types of historical social media gaming posts could open opportunities for players to challenge their past selves in a game and/or play against their friends' past selves, allowing them to visually see and measure their improvement over time.

These memory posts may also be generated during gameplay and stored for future use like snippets from kill events, achievement awards, etc. In a game like Call of Duty, for example, a player can engage in a match against a version of themselves from 2010, playing with the same style and skill level you had back then. If it is an event where a person was killed by friends, the same event may be replayed with the proxy users of the same level and game style play at that time against the user at their current skill level and gameplay style. This wouldn't just serve as an engaging gaming experience, but it could also provide valuable insights into how you've evolved as a player. Additionally, the present disclosure can recreate the environment of a 2010 multi-player game, including emulation of yourself along with emulations of all the other players present in that game. Therefore, this feature enables the user to to relive and interact with past gaming experiences. Through a social media timeline-like feature, these past gaming moments could be stored and accessed at any time. It would give players the power to pick and choose which past players or versions of themselves they want to emulate in a game. Currently, social media "memories" come from posts a user has previously made or liked and are generally created to be consumed by the social media user themselves. In some examples, gaming memories are distinguished from the memories on social media platforms as the content comes from the gaming system (a third party) and is posted to the user's social platform "memory feed" using content from previous game play—that, in some examples, is replayable and the outcome of which can be changed based on user actions.

In some examples, the aforementioned memory content may be created from a standalone gaming session outside of social media sharing when a user has a console or game engine account registered with a social media account. In some examples, these emulations run in the cloud in systems such as Nvidia Geforce Now, Microsoft Xbox Cloud Streaming, Sony PS Now, and others. Gaming services like these run the game on their servers, then stream the gaming (media) content to the player's device, while the player's inputs (e.g., button presses, mouse movements, etc.) are sent back to the server. In this system, emulated players could run on those emulators and join games just like regular players rather than as simple NPCs within a game. In particular, in some examples, an intermediary system, hosted for example in the cloud, creates the proxy user and inputs controller commands to the gaming services, such that the gaming service is unaware that a proxy user, as opposed to a real player is playing.

When joining a game or replaying a game in proxy user mode, each participating social media user becomes a 'temporary' profile within the game, with their names and badges mapped from the social media platform. The system enables adjustable difficulty levels, and active feedback collection to enhance the overall gaming experience. While there have been attempts to solve this problem of changing the level of play within a game by adjusting game parameters based on a player's skill level, the common method used to solve the problem (reducing game actions to words in order to feed into decision trees) does not provide a holistic view of a players abilities, preferences and other aspects which comprise the sum total of a player's "ability" or skill, reducing the solution to a simple decision tree. In some examples of the present disclosure, additional factors include multiplayer proxy user mode, learning of user preferences, in-game incentives, performance feedback to improve the NPC emulation as well as AI-generated commentary.

When a user "joins" a game from within the social media network via a social media post or story, the social media platform communicates with the gaming platform or game console platform to facilitate the loading and playing of the game. In some examples, this includes instructing the game console to download the game or game assets, the creation of the NPC emulator in the cloud, or in the case of cloud gaming, the creation of a cloud gaming session.

While current gaming technology offers sharing of gameplay, social interaction, and multiplayer features, the system extends beyond these capabilities. It enables the direct participation of social media users in a live or replay-enabled "ghost" game and introduces user-centric features to enhance the gaming experience. The system, therefore, represents a significant advancement over what is currently within the art.

Figure 4:
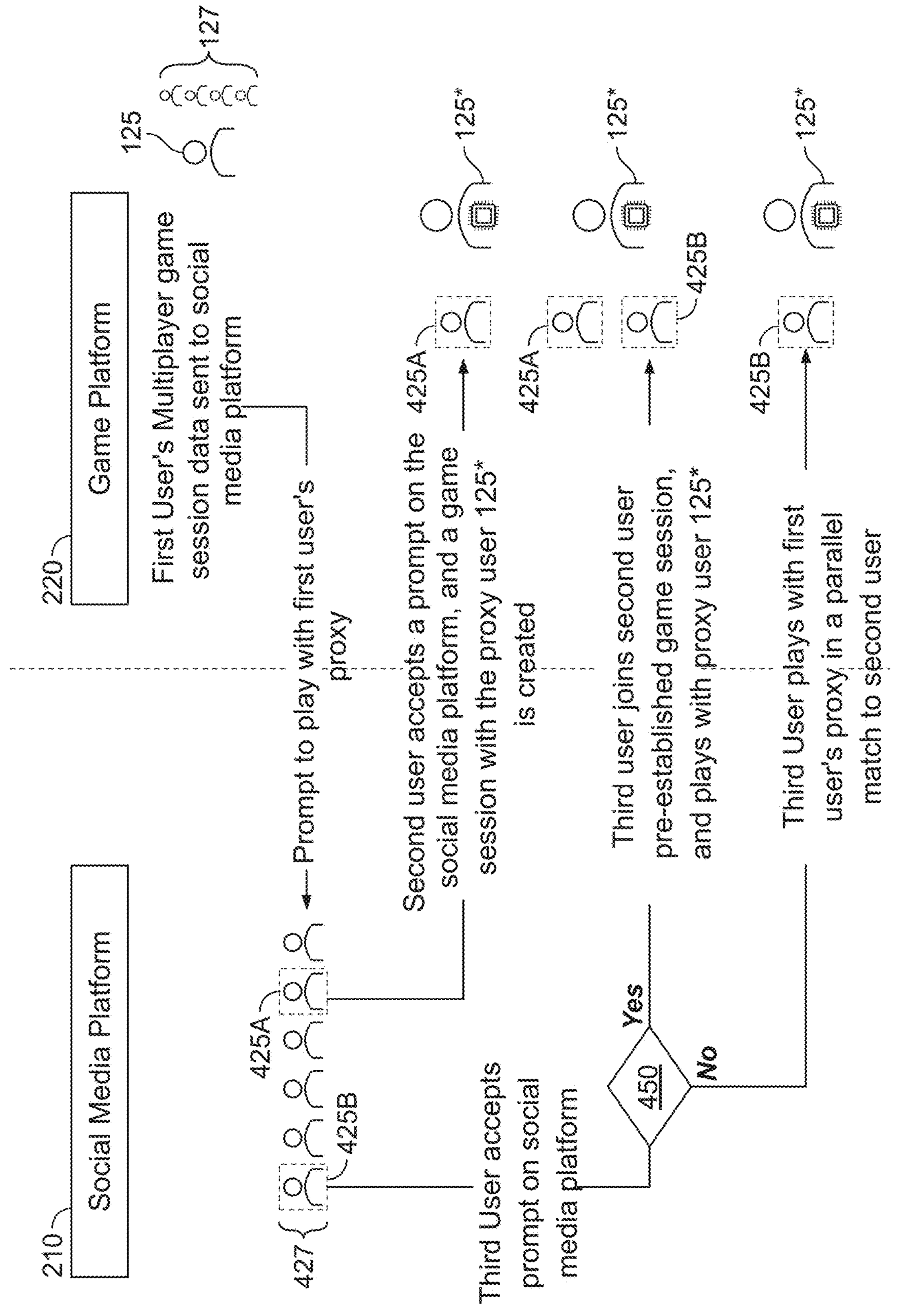
FIG. 4 illustrates the interaction between a social media platform and a game platform, in accordance with some examples of the disclosure.

FIG. 4 illustrates the interaction between a social media platform 210 and a game platform 220, in accordance with some examples of the disclosure. As described above, a user 125 begins playing, for example, a multiplayer online game with a plurality of other users 127 on a game platform 220. Game session data is sent from the game platform 220 to the social media platform 210. The game session data may be sent to the social media platform 210 from the game platform 220 in the form of a prompt. In some examples, the prompt sent to the social media platform comprises information relating to the user 125, as described in more detail with relation to FIG. 6B.

The prompt is sent to a plurality of users 427 of the social media platform 210. A first user 425A of the social media platform 210 may accept the prompt to play with the proxy user 125*, and a game session between the first social media user 425A and proxy user 125* is created.

In addition, or in parallel, a second user 425B of the social media platform 210 may accept the prompt to play with the proxy user 125*. At decision point 450, the system checks if the second social media user 425B is able to join the first social media user's 425A game with proxy user 125*. If the second social media user 425B is able to join the first social media user's 425A game, then the second social media user 425B joins that game. If the second social media user 425B is unable to join the second social media user's 425B game then the second social media user 425B joins a separate gaming session with the proxy user 125*.

Figure 5:
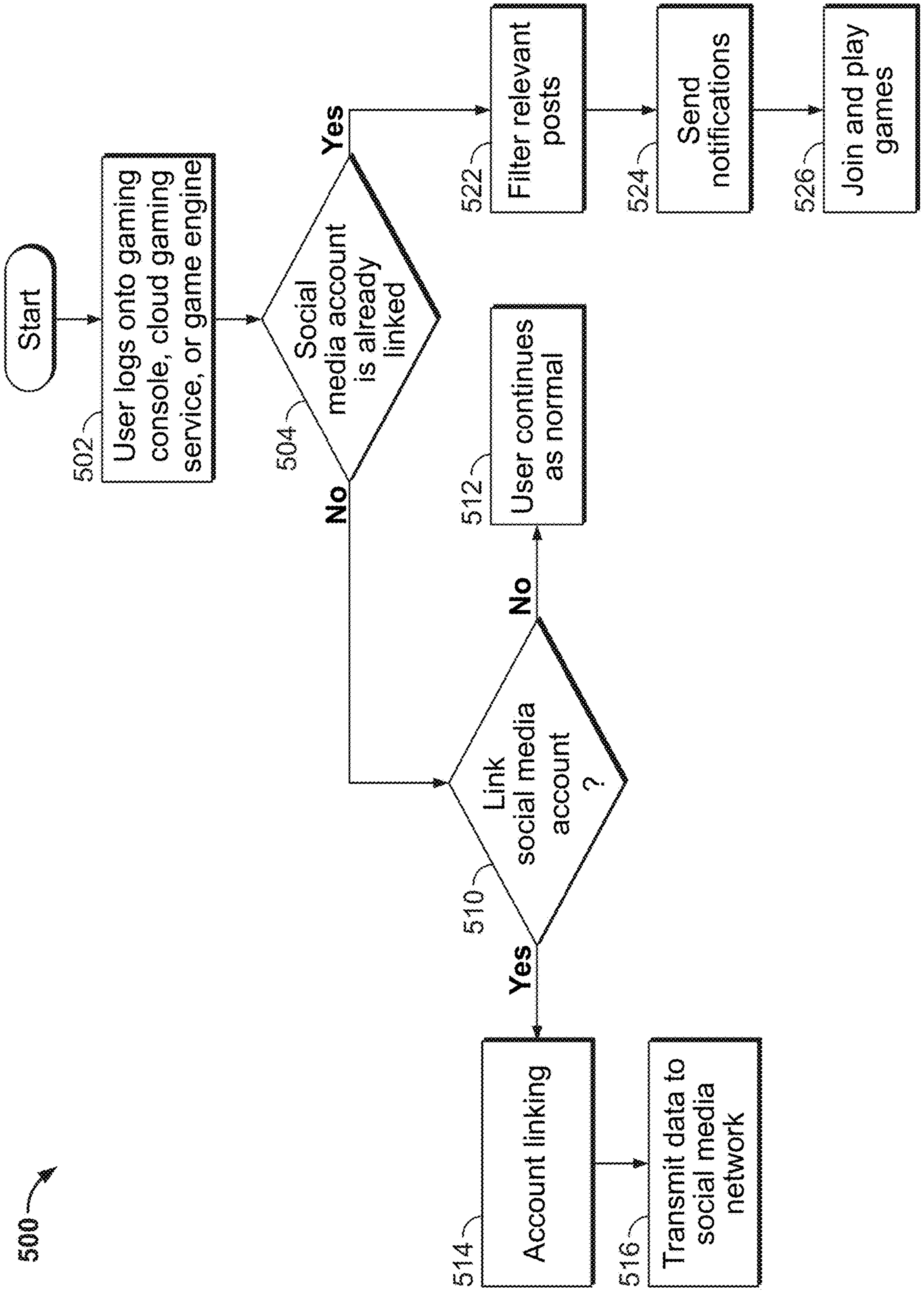
FIG. 5 depicts an illustrative flowchart of a process for playing against emulated players, in accordance with some examples of the disclosure.

FIG. 5 depicts an illustrative flowchart of a process 500 for playing against emulated players, in accordance with some examples of the disclosure. In some examples, user's link their social media profile or account to a gaming console or game engine account, information such as console model; mobile phone, tablet, console, or PC hardware capabilities; previously purchased games; and other such data is transmitted to the social media network to be used to filter relevant posts and enable game play notifications to be sent to the game console or game engine and for users to join and play the game. When relevant posts or updates related to the user's linked games are detected on the social media network, notifications can be sent directly to the user's console, cloud gaming account, or game engine, informing them of new activities, events, or updates within those games. Additionally, the integration allows users to join and play games directly through the social media network. Users can discover game-related content, such as invitations to multiplayer sessions, challenges, or events, and engage with them seamlessly from their social media profiles. This integration enhances the social and interactive aspects of gaming by providing a convenient way for users to connect, communicate, and participate in gaming experiences through their linked accounts.

Accordingly, at step 502, the user logs onto their gaming console, cloud gaming service, or game engine. At step 504 it is determined if a social media account is already linked. If the answer to step 504 is yes, process 500 continues on to step 522. If the answer to step 504 is no, process 500 continues on to step 510.

At step 510, the user is prompted to link their social media media account. If the user does not link their social media account, process 500 continues to step 512, where the user continues their session with the gaming console, cloud gaming service, or game engine. If the user does agree to link their social media account, process 500 continues to step 514, where in the social media account is linked with the gaming account. At step 516, gaming session data is transmitted to the social media platform 210.

At step 522, posts on the user's social media account are filtered to display relevant gaming sessions to join. At step 524, notifications of relevant gaming session are sent to the user. In some examples, the filtered posts are displayed and interactable on the user's separate personal PC, mobile device, smart device, or the like. In some examples, the filtered posts are displayed and interactable on the user's gaming console or game engine. At step 526, the user selects and joins a gaming session, as described herein.

Figure 6B:
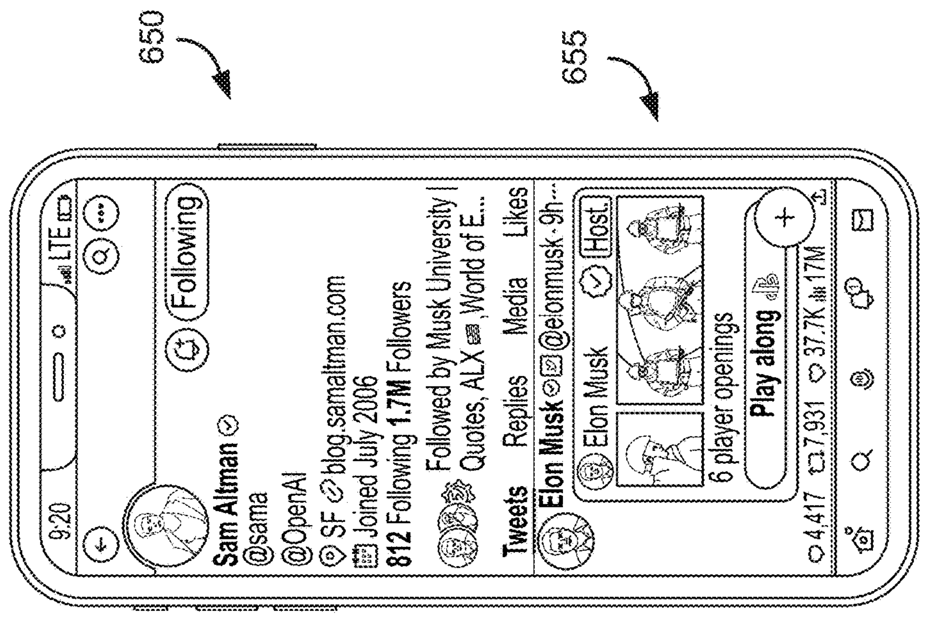
FIGS. 6A-6B depict an illustrative flowchart of a process for filtering posts for a gaming session and a figurative image of a possible filtered post, in accordance with some examples of the disclosure.
Figure 6A:
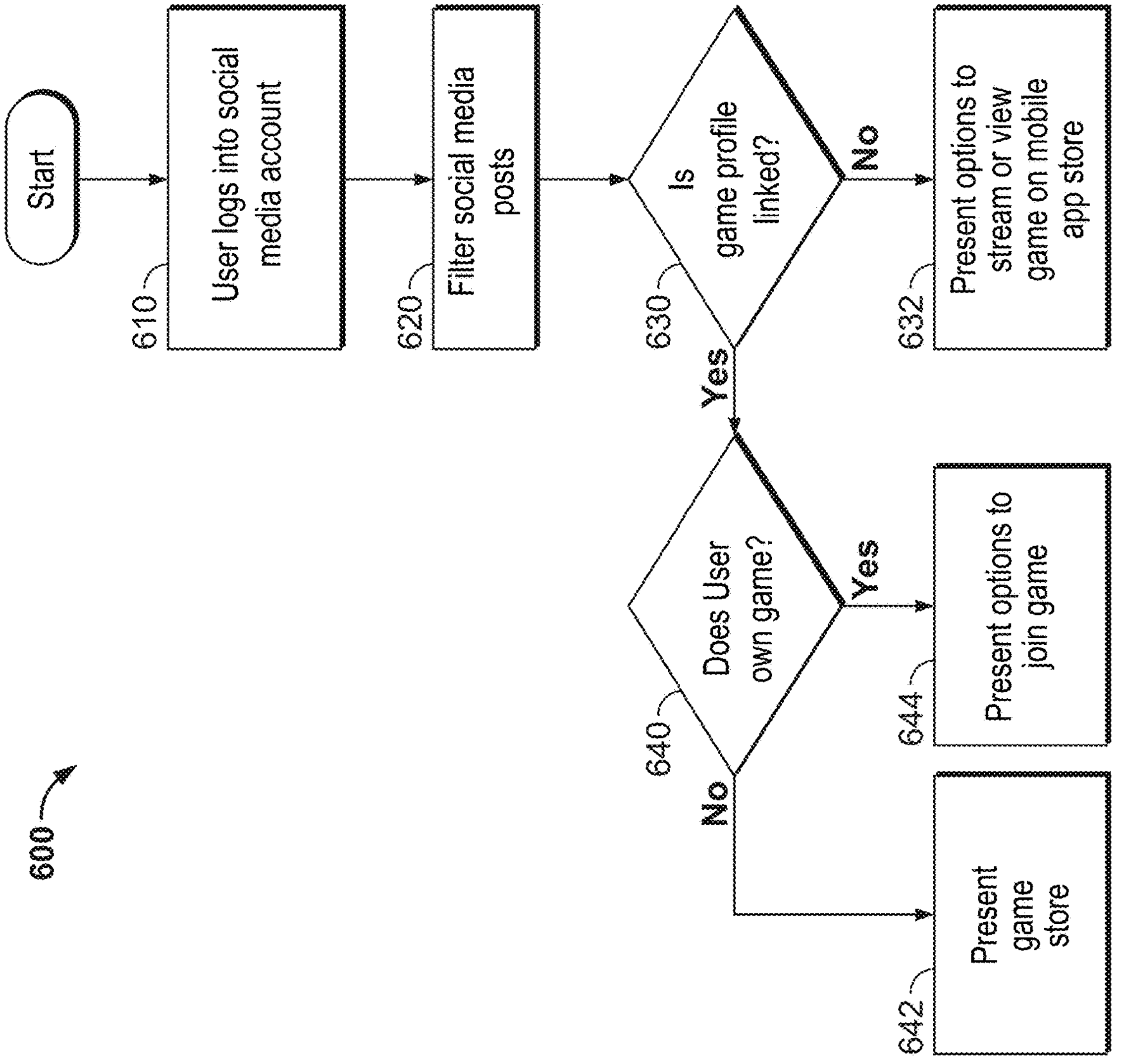

FIGS. 6A-6B depict (i) an illustrative flowchart of a process 600 for filtering posts for a gaming session and (ii) an image 650 of a possible filtered post 655, in accordance with some examples of the disclosure. The process 600 may be implemented, in whole or in part, by the system 121 shown in FIG. 3. One or more actions of the process 600 may be incorporated into or combined with one or more actions of any other process or embodiments described herein. The process 600 may be saved to a memory or storage (such as any one or more of those shown in FIGS. 1A-1C and 3) as one or more instructions or routines that may be executed by a corresponding device or system to implement the process 600. In some examples, the social media network applies filters for posts (gaming posts) to enable joining a game, joining a "ghost mode" version of the game based on the data sent to and stored in the social media platform, as described above, subscribing to a cloud gaming service to play the game, or streaming the game video. These filters utilize the data transmitted from the user's gaming console or game engine account, which includes information such as console model, hardware capabilities, previously purchased games, and other relevant data.

Based on this information, the social media platform can determine the available options for the user. If a user does not have a game console or a game engine account, or if they do not own the particular game being discussed in the post, the platform can present alternative choices. In some examples, an option is to stream the game. Users without a game console or game engine account, the user can still experience the game by streaming it through the social media network. This means they can watch live gameplay sessions or pre-recorded videos of previously played games.

In some examples, the user can join a "ghost mode" version of the game. "Ghost mode" typically refers to a feature that allows players to participate in a game without directly interacting with other players in real time. In this example, users who don't have the necessary gaming accounts or game ownership may have the option to join a ghost mode version of the game, where they can play in a solo or AI-controlled mode, emulating the gameplay experience. In some examples, the "ghost mode" version would allow a user to launch the game in a mobile device version of the game or to be directed to a device app store to purchase or download the game and launch it. Furthermore, the game can be launched from a cloud gaming subscription service, which the user has subscribed to or can be prompted to subscribe to.

Accordingly, at step 610 of process 600, the user logs into their social media account. At step 620, the posts that the user sees on the social media account are filtered to display gaming sessions that the user can join a proxy user 125*, as shown in FIG. 6B.

At step 630, it is determined if the game console, game engine, or cloud gaming service is linked to the user's social media account. If the answer to step 630 is no, process 600 continues on to step 632. At step 632, the user is presented with the option to stream the gaming session the user 125 is playing or view the game for purchase on a relevant app/gaming store. If the answer to step 603 is yes, process 600 continues on to step 640.

At step 640, it is determined if the user owns the game. If the answer to step 640 is no, process 600 continues on to step 642. At step 642, the user is presented a game store link, cloud service link, or an application is launched for the user to purchase the game. If the answer to step 640 is yes, process 600 continues on to step 644. At step 644, the user is present options to join the gaming session, in the mechanisms explained above. Process 600 may be incorporated into other processes herein, such as process 500. Alternatively, process 600 may be carried out in parallel to the processes herein, such as, again, process 500.

Figure 7:
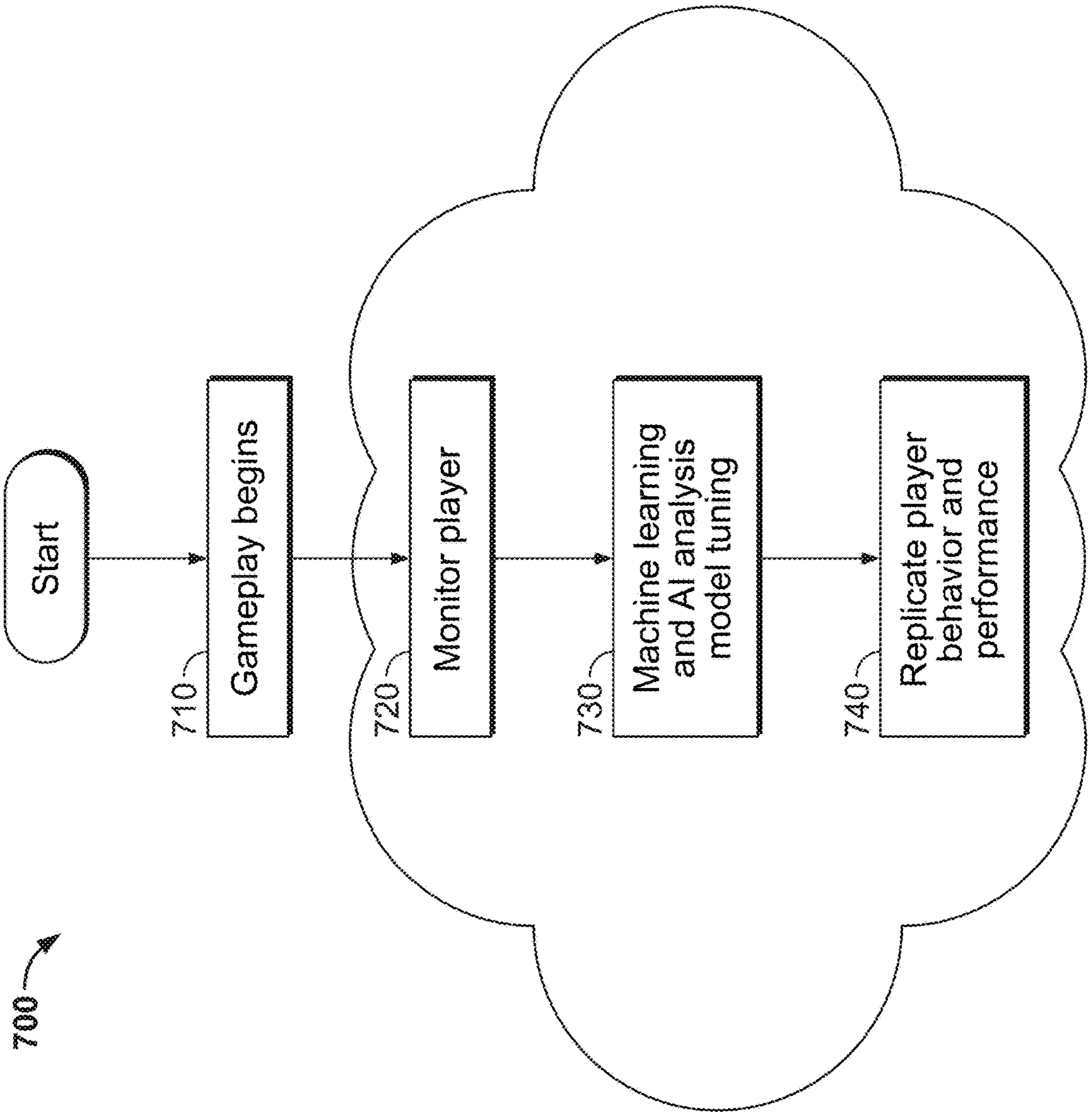
FIG. 7 depicts an illustrative flowchart of a process for monitoring players with an AI model, in accordance with some examples of the disclosure.

FIG. 7 depicts an illustrative flowchart of a process 700 for monitoring players with an AI model, in accordance with some examples of the disclosure. Process 700 may be implemented, in whole or in part, by the system 121 shown in FIG. 3. One or more actions of the process 700 may be incorporated into or combined with one or more actions of any other process or embodiments described herein. Process 700 may be saved to a memory or storage (such as any one or more of those shown in FIGS. 1A-1C and 3) as one or more instructions or routines that may be executed by a corresponding device or system to implement process 700.

In some examples, during gameplay, a cloud server actively monitors the players, with a particular focus on the player who shared the game on the social media platform. The server learns about this player's ability and style of play using Machine Learning algorithms and AI. This data is used to replicate the player's performance and behavior emulation in "ghost mode". In addition to learning the first user's skill and style, the system will also learn about the player's in-game preferences. This will include their favorite characters, weapons, tactics, etc., providing a more realistic representation of the first user in ghost mode. Different algorithms can be used such as reinforcement learning where the AI is rewarded or penalized based on the moves it makes within the game. Supervised learning where the AI algorithm learns from labeled training data, and this knowledge is applied to new data.

For instance, different aspects of player behavior can be labeled and categorized (aggressive, defensive, prefers magic, favors stealth, etc.), and a supervised learning algorithm like a Decision Tree or Neural Network could be trained on this data, Deep Learning, which is a form of machine learning that uses artificial neural networks with multiple layers (hence 'deep'), deep learning can handle complex, high dimensional data. Convolutional Neural Networks (CNNs) can be used for image-based data (such as recognizing preferred in-game locations or actions from screen images), while Recurrent Neural Networks (RNNs) or Long Short-Term Memory networks (LSTMs) can handle sequential data, like a series of actions taken by a player and Transfer Learning where a pre-trained model, often trained on a large, general dataset, is fine-tuned it for a specific task. For example, an AI model that has been generally trained on gameplay data from many players can be fine-tuned to mimic a specific player's style and preferences.

Accordingly, at step 710 of process 700, the gameplay session is initiated. At step 720, the system monitors the player in the gameplay session. At step 730, machine learning and AI analysis tune the models discussed above. At step 740, the tuned models are now able to replicate player behavior and their performance to provide a representative experience to the other users joining their gaming session. Process 700 may be incorporated into other processes herein, such as processes 500 to 600. Alternatively, process 700 may be carried out in parallel to the processes herein, such as, again, processes 500 to 600.

Figure 8:
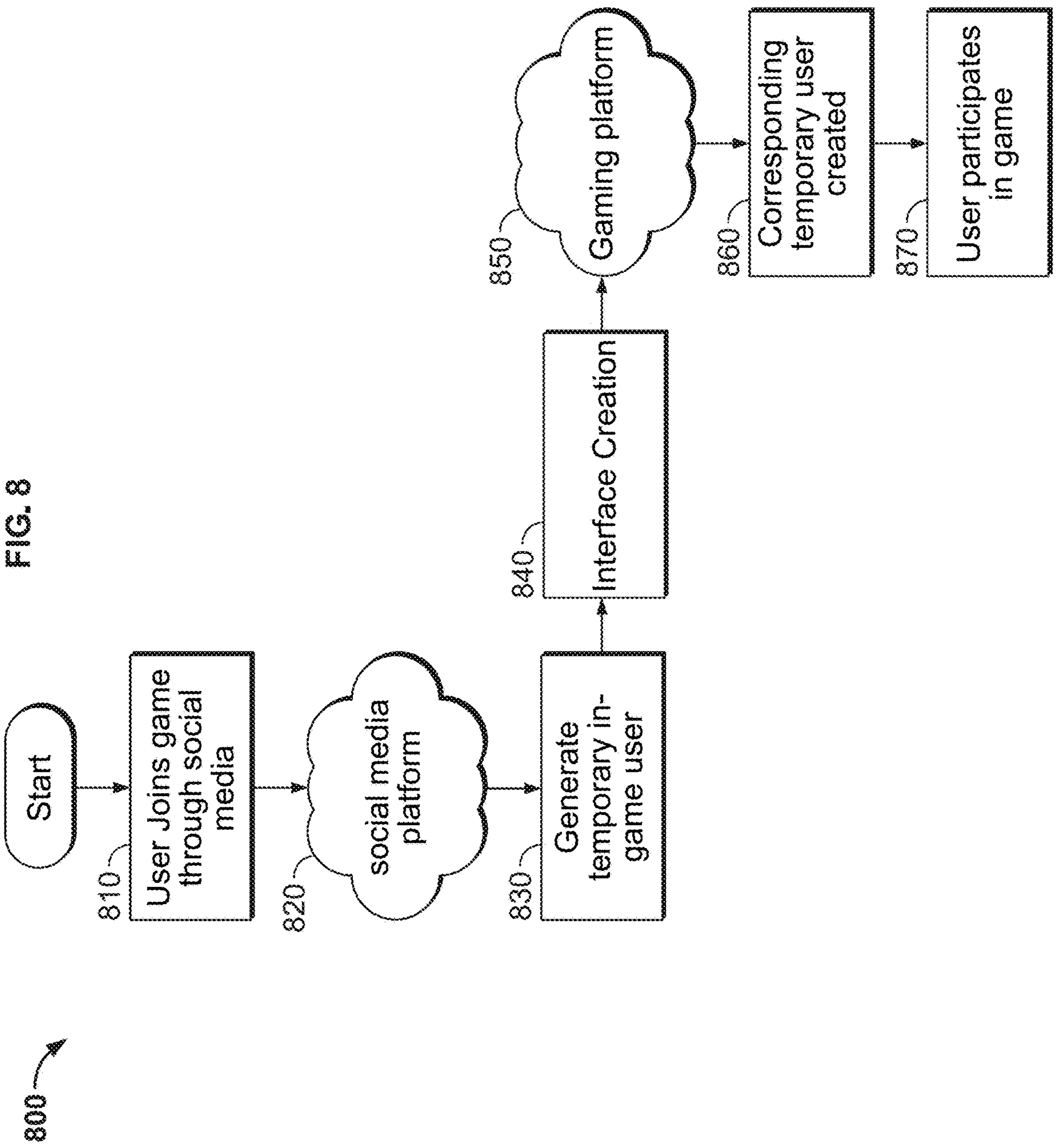
FIG. 8 depicts an illustrative flowchart of a process for generating an in-game user that corresponds to the joining user's social media profile, in accordance with some examples of the disclosure.

FIG. 8 depicts an illustrative flowchart of a process 800 for generating an in-game user that corresponds to the joining user's social media profile, in accordance with some examples of the disclosure. In some examples, when a social media user decides to join the live game, the system generates a "temporary" in-game user that corresponds to the joining user's social media profile. This system creates an interface between the gaming platform and the social media platform, which allows users from the social media platform to join in on the live game experience more seamlessly, without necessarily needing their own permanent gaming profile or credentials.

Process 800 may be implemented, in whole or in part, by the system 121 shown in FIG. 3. One or more actions of the process 800 may be incorporated into or combined with one or more actions of any other process or embodiments described herein. Process 800 may be saved to a memory or storage (such as any one or more of those shown in FIGS. 1A-1C and 3) as one or more instructions or routines that may be executed by a corresponding device or system to implement process 800.

Accordingly, at step 810 of process 800, the user joins the game through the social media platform 210. At step 820, data from the social media platform is retrieved. At step 830, a temporary in-game user profile, corresponding to the user's social media platform 210 data is generated on the social media platform 210. At step 840, an interface between the social media platform 210 and the gaming platform 220 is created. At step 850, the gaming platform 220 receives the temporary in-game user profile. At step 860, a corresponding temporary in-game user profile is created on the gaming platform 220. At step 870, the user participates in the gaming session on the gaming platform 220 with the temporary in-game user profile, that corresponds back to the user's social media profile on the social media platform 210. Process 800 may be incorporated into other processes herein, such as processes 500 to 700. Alternatively, process 800 may be carried out in parallel to the processes herein, such as, again, processes 500 to 700.

Figure 9A:
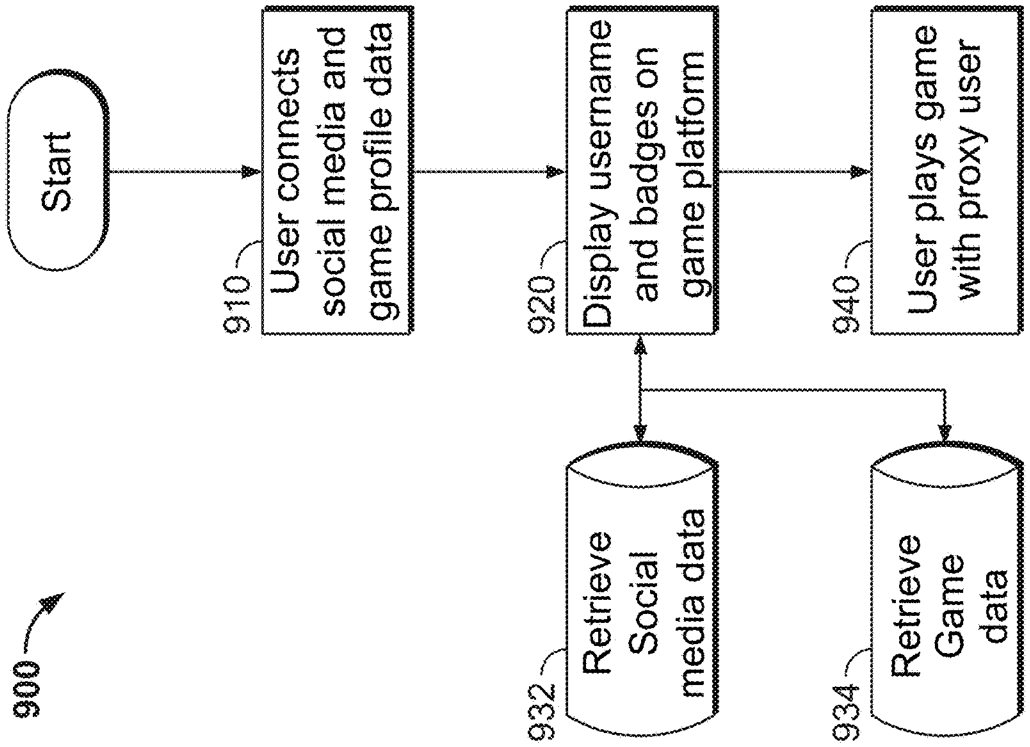
FIGS. 9A-9B depict an illustrative flowchart of a process for displaying user identities in a game environment and a figurative image of a game environment, in accordance with some examples of the disclosure.
Figure 9B:
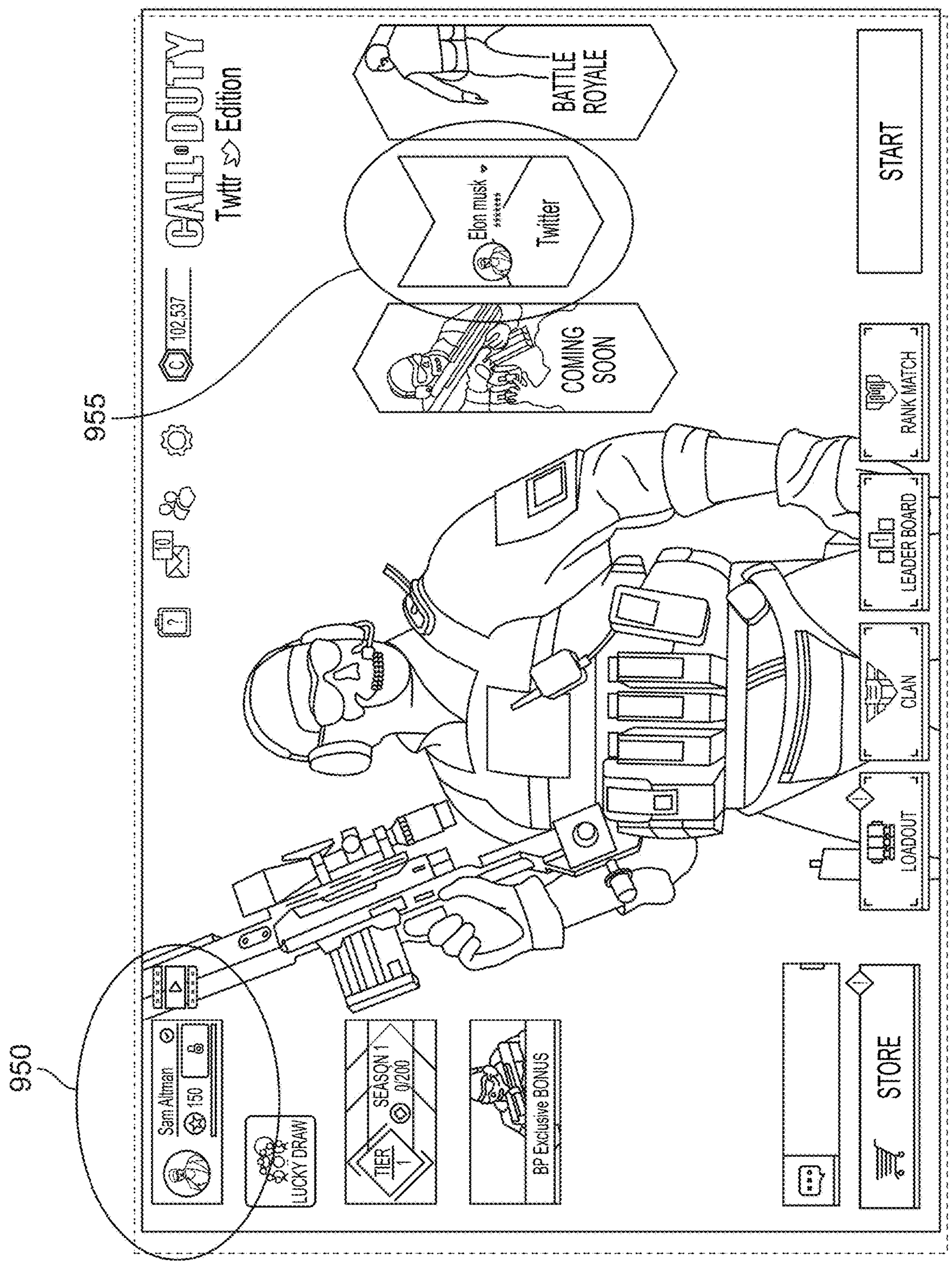

FIGS. 9A-9B depict an illustrative flowchart of a process for displaying user identities in a game environment and a figurative image of a game environment, in accordance with some examples of the disclosure. In some examples, player names and relevant badges 950 (e.g., verification badges) are mapped from the social media platform to the game. This keeps the users' identities consistent across both platforms, enhancing the sense of community and interaction. Player skill level and statistics may be reverse mapped back to their social media platform account for display or to be used by others when joining a live game or playing in "ghost mode".

Process 900 may be implemented, in whole or in part, by the system 121 shown in FIG. 3. One or more actions of process 900 may be incorporated into or combined with one or more actions of any other process or embodiments described herein. Process 900 may be saved to a memory or storage (such as any one or more of those shown in FIGS. 1A-1C and 3) as one or more instructions or routines that may be executed by a corresponding device or system to implement process 900.

Accordingly, at step 910 of process 900, the user connects their social media account and gaming profile, for example, the user may link their social media data and gaming profile data. At step 920, the system displays the username and badges 950 for viewing in the gaming platform 220. This data is created from the user's social media data, which is retrieved in step 932, and the user's gaming profile data, which is retrieved in step 934. At step 940, the user plays the game with the proxy user 125*. In some examples, the proxy user's 125* social media credentials are displayed in the gaming environment as shown in 955 of FIG. 9B. Process 900 may be incorporated into other processes herein, such as processes 500 to 800. Alternatively, process 900 may be carried out in parallel to the processes herein, such as, again, processes 500 to 800.

Figure 10:
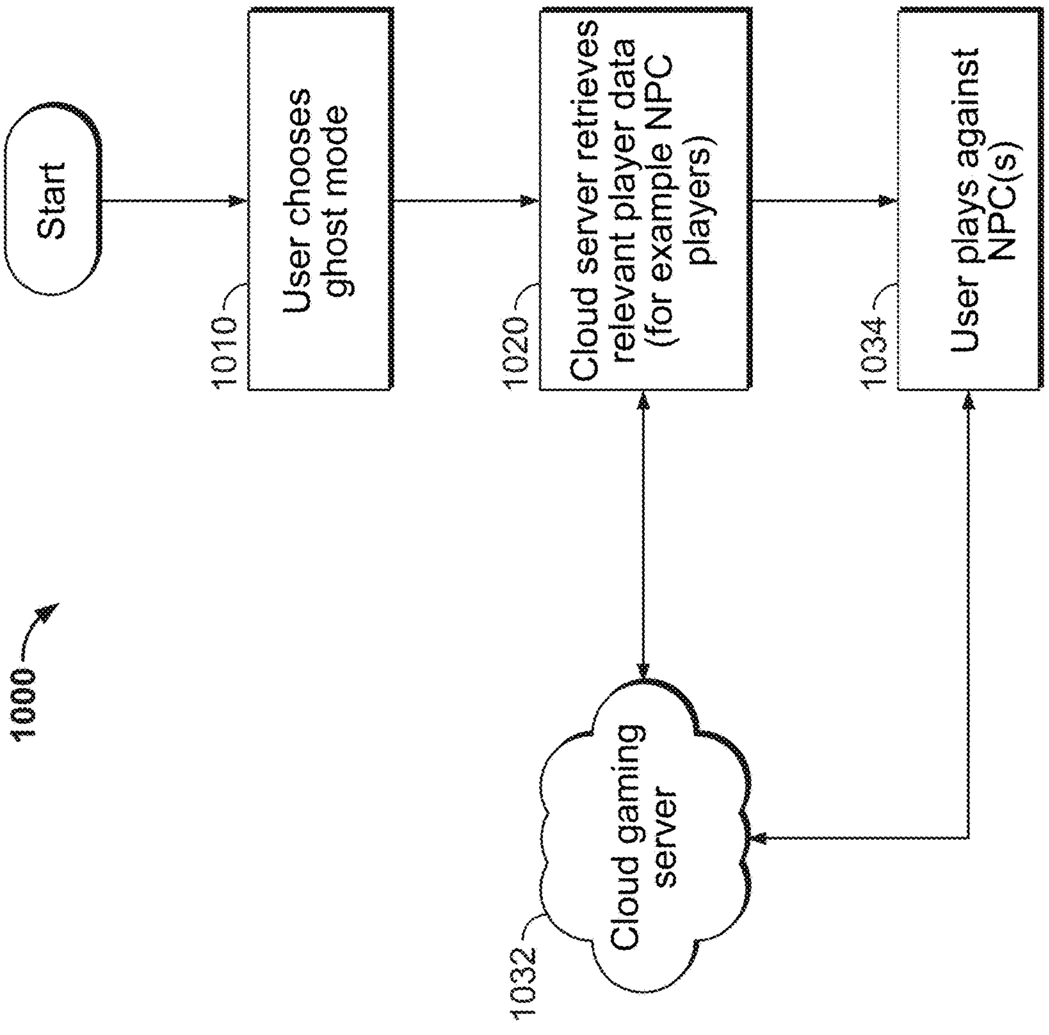
FIG. 10 depicts an illustrative flowchart of a process for creating unique non-player characters, in accordance with some examples of the disclosure.

FIG. 10 depicts an illustrative flowchart of a process for creating unique non-player characters, in accordance with some examples of the disclosure. As mentioned above, in some examples, when users decide to play the game in "ghost mode", they will play against non-player characters (NPCs) that mimic the gameplay style of the first user. The NPC's skill level is based on the information the cloud server learned about the first user. This creates a unique and personalized gaming experience for each user that persists even beyond the timeframe of the live game. Typically, over time, a player's skill level increases, as such, the skill level of the game joined from a social media post may reflect the skill level of the player at the time the post was made. The unique behaviors and skill level of these NPCs are based on the information the cloud server learned about the first user, creating a unique and personalized gaming experience for each user.

Process 1000 may be implemented, in whole or in part, by the system 121 shown in FIG. 3. One or more actions of process 1000 may be incorporated into or combined with one or more actions of any other process or embodiments described herein. Process 1000 may be saved to a memory or storage (such as any one or more of those shown in FIGS. 1A-1C and 3) as one or more instructions or routines that may be executed by a corresponding device or system to implement process 1000.

Accordingly, at step 1010 of process 1000, the user chooses to play the game in "ghost mode" with a proxy user 125*. At step 1020, the cloud server 1032 retrieves relevant player data, to create, for example, NPC characters in the game environment. At step 1034, the user plays against the NPCs that mimic the gameplay style of the first user's whose data was used to model those NPCs. Process 1000 may be incorporated into other processes herein, such as processes 500 to 900. Alternatively, process 1000 may be carried out in parallel to the processes herein, such as, again, processes 500 to 900.

Figure 11A:
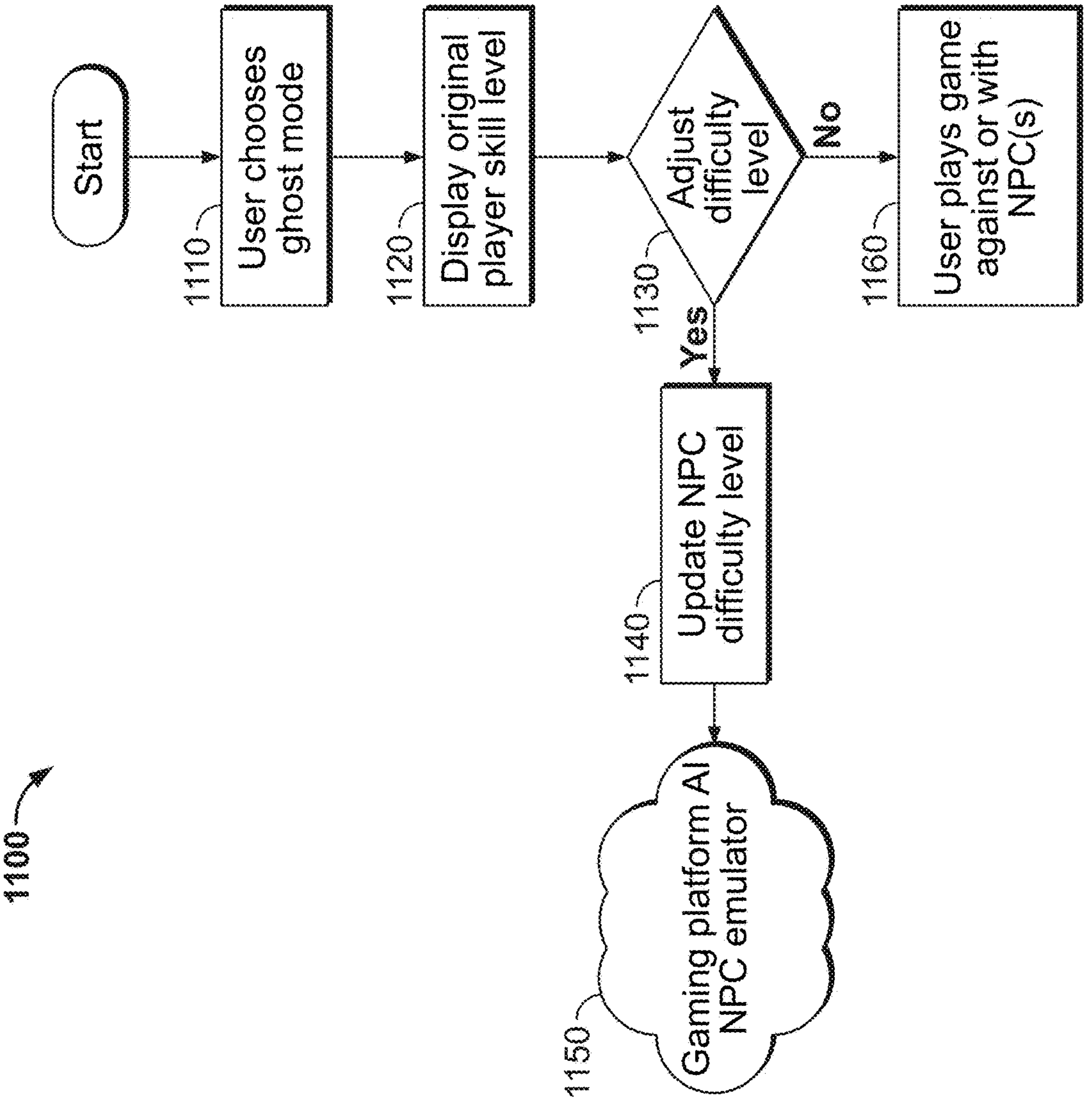
FIGS. 11A-11B depict an illustrative flowchart of a process for changing the difficulty of a non-player character and a figurative image of a game environment, in accordance with some examples of the disclosure.
Figure 11B:
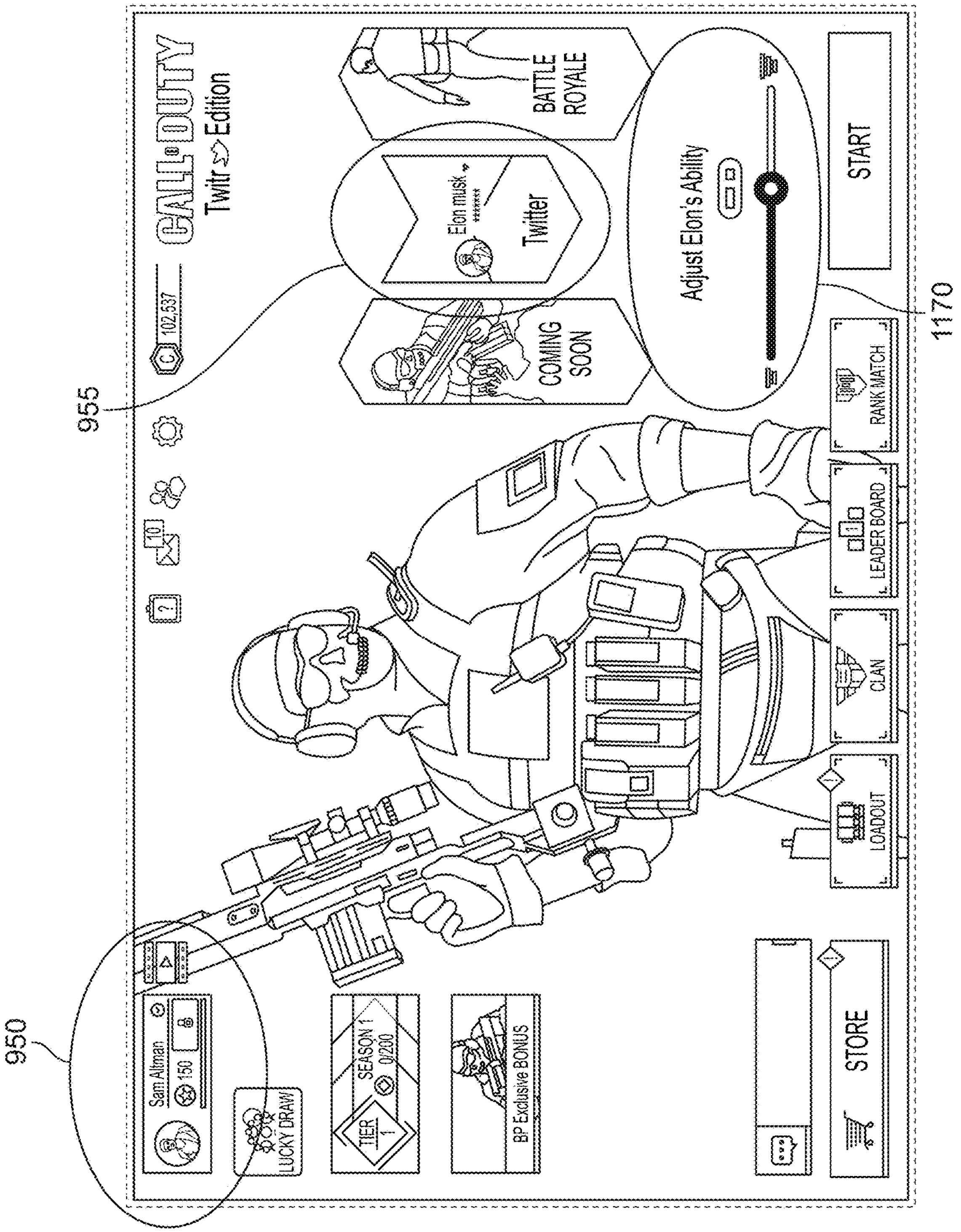

FIGS. 11A-11B depict an illustrative flowchart of a process for changing the difficulty of a non-player character and a figurative image of a game environment, in accordance with some examples of the disclosure. In some examples, the system includes a feature for adjusting the difficulty level of the proxy user 125* in "ghost mode". If a player finds the first user's skill level too high or too low, in some examples, they are provided with the option to modify the difficulty of the proxy user 125* or change to a previous version of the proxy user 125*, for example from 2010 @Elonmusk to 2023 @Elonmusk. This could be adjusted from the original social media post before the user chooses to join in "ghost mode" from within the game experience or with an auto level preference. Additionally, the first users skill level could be displayed or even updated on the social media post, as shown in 1170 on FIG. 11B.

Process 1100 may be implemented, in whole or in part, by the system 121 shown in FIG. 3. One or more actions of process 1100 may be incorporated into or combined with one or more actions of any other process or embodiments described herein. Process 1100 may be saved to a memory or storage (such as any one or more of those shown in FIGS. 1A-1C and 3) as one or more instructions or routines that may be executed by a corresponding device or system to implement process 1100.

Accordingly, at step 1110 of process 1100, the user chooses to play the game in "ghost mode". At step 1120, the original skill level of the player is displayed to the user. At step 1130, the user is prompted to adjust the difficulty level of the proxy user 125*. If the user adjusts the difficulty level of the proxy user 125*, process 1100 continues on to step 1140. If the user does not adjust the difficulty level of the proxy user 125*, process 1100 continues on to step 1160.

At step 1140, the difficulty of the NPC (i.e., the proxy user 125*, and/or others) is updated to the selected difficulty level. At step 1160, the difficulty level of the most up to date proxy user 125* (and/or other NPCs) is selected. At step 1150, the gaming platform receives the selected difficulty level and updates the AI NPC emulator accordingly. Process 1100 may be incorporated into other processes herein, such as processes 500 to 1000. Alternatively, process 1100 may be carried out in parallel to the processes herein, such as, again, processes 500 to 1000.

Figure 12A:
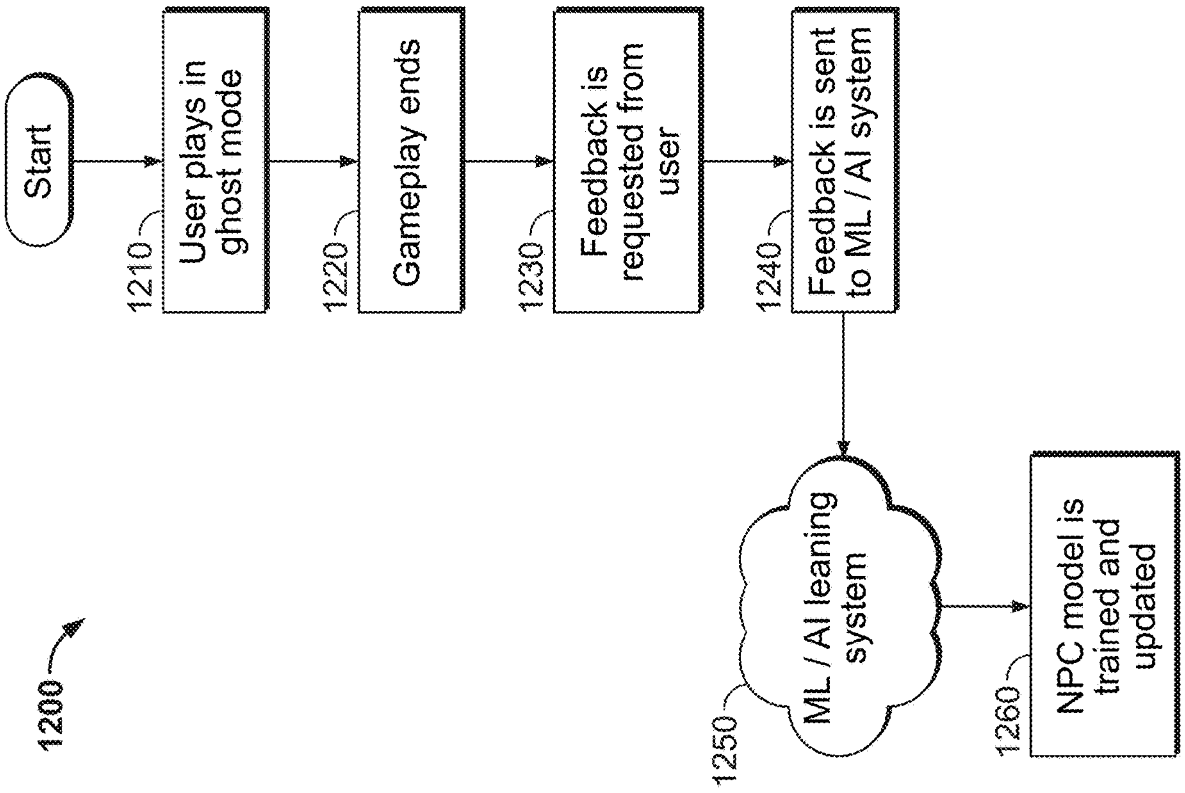
FIGS. 12A-12B depict an illustrative flowchart of a process for providing feedback on non-player character performance and a figurative image of a game environment, in accordance with some examples of the disclosure.
Figure 12B:
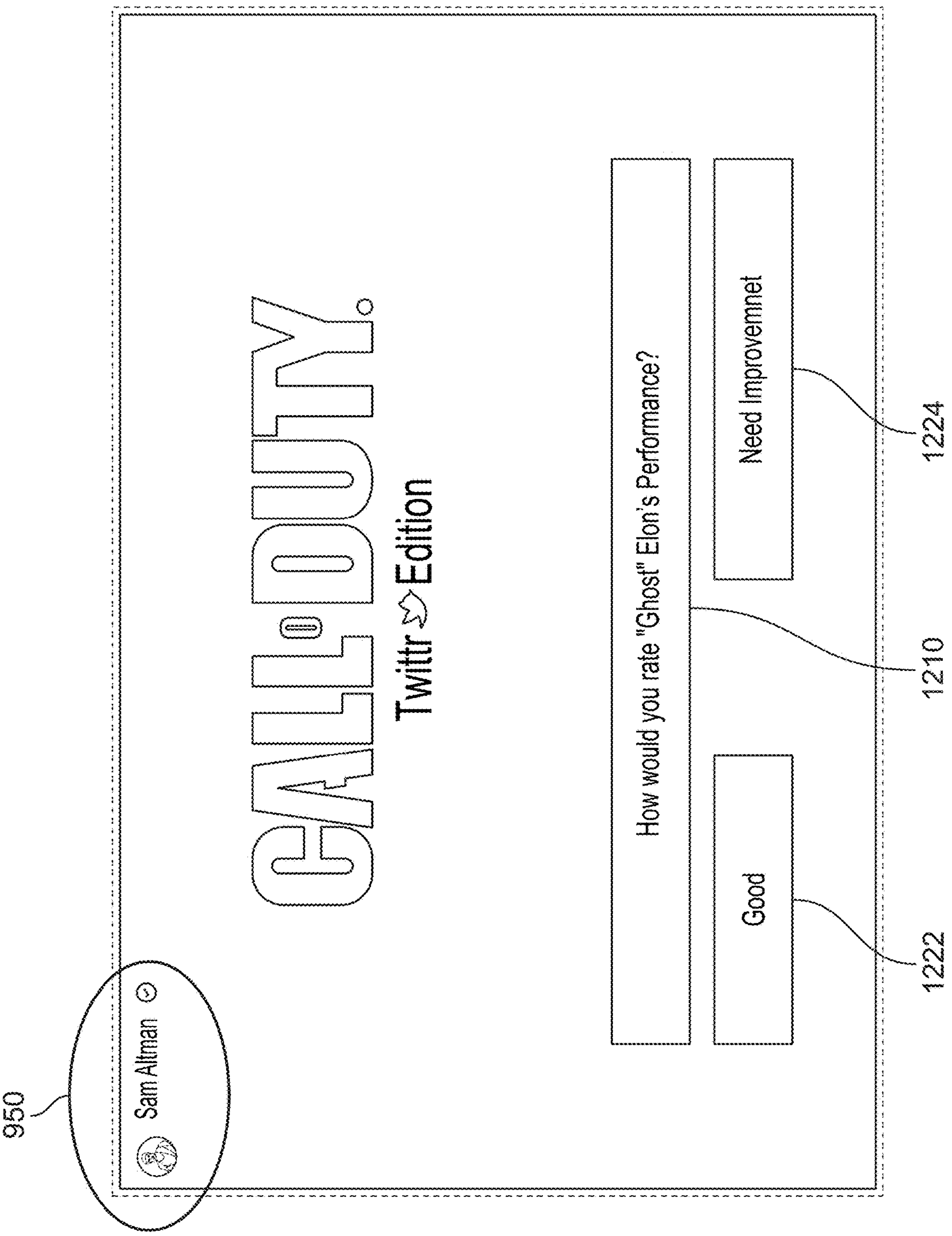

FIGS. 12A-12B depict an illustrative flowchart of a process for providing feedback on non-player character performance and a figurative image of a game environment, in accordance with some examples of the disclosure. In some examples, after playing a game in "ghost mode", players could have the opportunity to provide feedback 1270 on how accurately they feel the NPC emulated the first user. This information is sent to the ML/AI system and is used to continually improve the system's learning algorithm. The user can select options 1272, 1274 to provide feedback to the system.

Process 1200 may be implemented, in whole or in part, by the system 121 shown in FIG. 3. One or more actions of process 1200 may be incorporated into or combined with one or more actions of any other process or embodiments described herein. Process 1200 may be saved to a memory or storage (such as any one or more of those shown in FIGS. 1A-1C and 3) as one or more instructions or routines that may be executed by a corresponding device or system to implement process 1200.

Accordingly, at step 1210 of process 1200, the user chooses to the play the game in "ghost mode". At step 1220, the system identifies that the game play has ended. At step 130, feedback is requested from the user. At step 1240, the feedback from the user is sent to the ML/AI system emulator. At step 1250, the ML/AI learning system receives the feedback. At step 1260, the NPC is trained and updated according to the feedback. Process 1200 may be incorporated into other processes herein, such as processes 500 to 1100. Alternatively, process 1200 may be carried out in parallel to the processes herein, such as, again, processes 500 to 1100.

In some examples, feedback may only be requested from players (i.e., the second user) that can accurately rate the proxy user's performances vs the first user that the proxy user is based on. For example, if the second user has experience playing with the first user, then the second user may be marked as eligible to provide feedback and/or rate the accuracy of the proxy user, as they will be able to provide feedback based on past experiences.

Alternatively, in some examples, rather than selecting eligible players to provide feedback, additional weighting can be given to the feedback provided by players with real world experience. For example, a social score between the first user and the second user is determined to provide additional weighting to the feedback provided by the second user regarding the proxy user's performance. The social score is a reflection of the closeness of the second user to the first user, therefore it is advantageous to calculate the social score is based on one or more of: watch time (WT), follow time (FT), playtime (PT), subscriber status (SS), comment count (CC), like count (LC), or direct message count (DMC). For example, the second user may be a viewer of the first user's streaming channel, therefore a non-personal relationship can be assumed and watch-time, subscriber status, and the like will be the primary factors in their social score, which will be reflected in their feedback regarding the proxy user by a medium weighting. However, the first user may be a friend of the second user, and the second user may have 400 hours in a game with the first user, their social score will be high, which will be reflected in their feedback regarding the proxy user by a high weighting. Lastly, the first user and second user may have no relationship at all, their social score will be low, which will be reflected in their feedback regarding the proxy user by a low weighting.

The social score may be calculated as an aggregate of the ratio to the mean of any one or more of the metrics as described above . . . for example:

$$\frac{1}{\text{social score}} = \left[\frac{\overline{WT}}{WT_2}\right] + \left[\frac{\overline{FT}}{FT_2}\right] + \left[\frac{\overline{SS}}{SS_2}\right] + \left[\frac{\overline{CC}}{CC_2}\right] + \left[\frac{\overline{LC}}{LC_2}\right] + \left[\frac{\overline{DMC}}{DMC_2}\right] + \left[\frac{PT_1 - PT_2}{PT_1}\right] \ldots$$

In this way, the average measure of all users, is measured against the second user's measure. E.g., if the watch time for the first user's stream is an average of 200 hours for a user, and the second user has 100 hours-they are below average and therefore the weighting will be low. E.g., if the average DM count between a user and the first user is 20, and the second user has 60 DMs-they are above average and therefore the weighting will be high. In some examples, all measures can be used, or any one or more of these measures can be used.

By way of example, if the first user has a play time $PT_1$ in the game of 250 hours; and a second user has a playtime in the game with the first user of 200 hours, the system may determine the social score as:

$$\frac{1}{\text{social score}} = \frac{250 - 200}{250} = 0.2$$

This yields a social score of 5, meaning that the weighting for any feedback given by the user is increased by 5 times (5×).

Figure 13:
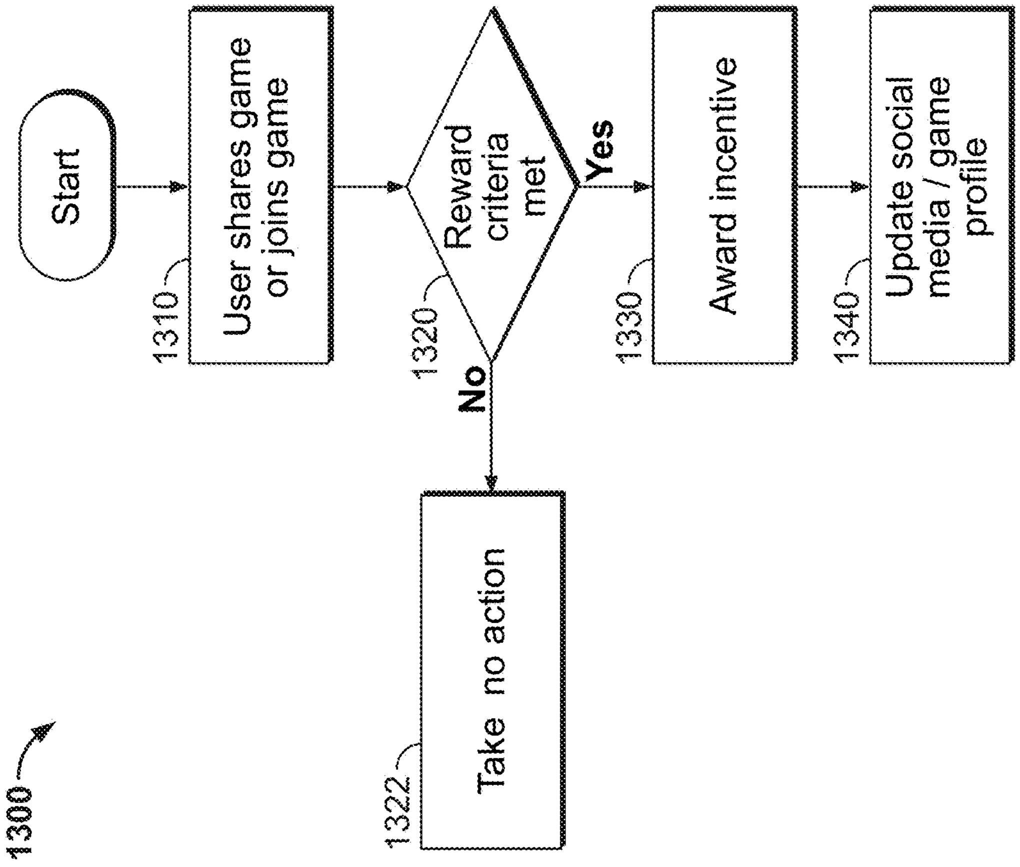
FIG. 13 depicts an illustrative flowchart of a process for providing reward incentives, in accordance with some examples of the disclosure.

FIG. 13 depicts an illustrative flowchart of a process for providing reward incentives, in accordance with some examples of the disclosure. In some examples, rewards or incentives for players who share their games on social media, or for social media users who join the game could be awarded to users. For example, a player could earn a badge or a special loot box item if the game shows up on their social media profile or the number of followers they have could give them extra "health" or "loot".

Process 1300 may be implemented, in whole or in part, by system 121 shown in FIG. 3. One or more actions of process 1300 may be incorporated into or combined with one or more actions of any other process or embodiments described herein. Process 1300 may be saved to a memory or storage (such as any one or more of those shown in FIGS. 1A-1C and 3) as one or more instructions or routines that may be executed by a corresponding device or system to implement process 1300.

Accordingly, at step 1310 of process 1300, the user shares the game or joins another already initiated "ghost mode" game session. At step 1320, it is determined if the user's participation has met the criteria for reward. If the answer to step 1320 is no, process 1300 continues on to step 1322. If the answer to step 1320 is yes, process 1300 continues on to step 1330. At step 1322, no action is taken.

At step 1330, the amount of the reward incentive is determined. At step 1340, the reward incentive is sent to the social media platform 210 for display on the user's social media account, and/or is sent to the game platform 220 to be redeemed by the user. Process 1300 may be incorporated into other processes herein, such as processes 500 to 1200. Alternatively, process 1300 may be carried out in parallel to the processes herein, such as, again, processes 500 to 1200.

Figure 14:
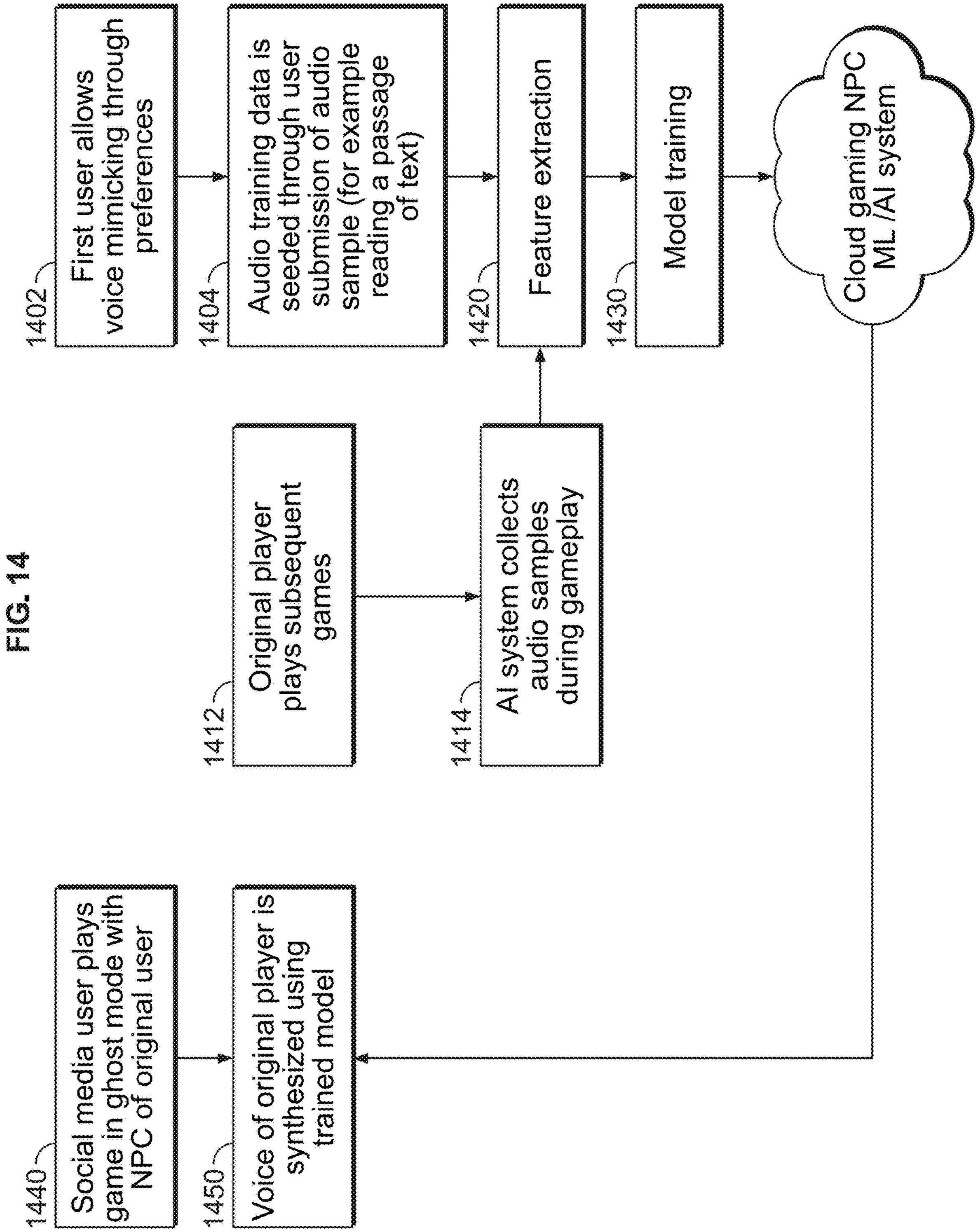
FIG. 14 depicts an illustrative flowchart of a process for creating commentary based on user gameplay data, in accordance with some examples of the disclosure.

FIG. 14 depicts an illustrative flowchart of a process for creating commentary based on user gameplay data, in accordance with some examples of the disclosure. In some examples, generative AI, prompted by the NPC emulator, is used to create commentary on the gameplay. This could involve describing tactics, summarizing the gameplay session, or providing insights into the first user's strategy. In some examples, if permitted, the AI can generate a commentary voice of a specific individual, like Elon Musk. If not, a generic voice can be used. In some examples, when permission is given, the system analyzes the collected audio to extract important features, such as pitch, rhythm, timbre, and stress patterns, among others. These features provide the raw material the AI uses to generate new speech.

Process 1400 may be implemented, in whole or in part, by system 121 shown in FIG. 3. One or more actions of process 1400 may be incorporated into or combined with one or more actions of any other process or embodiments described herein. Process 1400 may be saved to a memory or storage (such as any one or more of those shown in FIGS. 1A-1C and 3) as one or more instructions or routines that may be executed by a corresponding device or system to implement process 1400.

Accordingly, at step 1402 of process 1400, the first user, such as user 125, provide permission to allow voice mimicking through the preferences on the gaming platform 220 and/or the social media platform 210. At step 1402, audio training data is seeded through user submission of audio samples (for example reading of preselected passages of text).

In addition or in parallel, at step 1412, the first user, such as user 125, will play subsequent games. At step 1414, further audio samples are collected form the user during game play. At step 1420, features from the initial audio training data, and additional audio samples if applicable, are extracted. At step 1430, a natural language model is trained on the extracted features.

At step 1440, a social media user, such as 425A-B, plays a game in "ghost mode" with a proxy user 125* of user 125. At step 1450, the voice from the first user, such as user 125, is synthesized using the trained model to give proxy user 125* the voice characteristics of user 125. Process 1400 may be incorporated into other processes herein, such as processes 500 to 1300. Alternatively, process 1400 may be carried out in parallel to the processes herein, such as, again, processes 500 to 1300.

Figure 15:
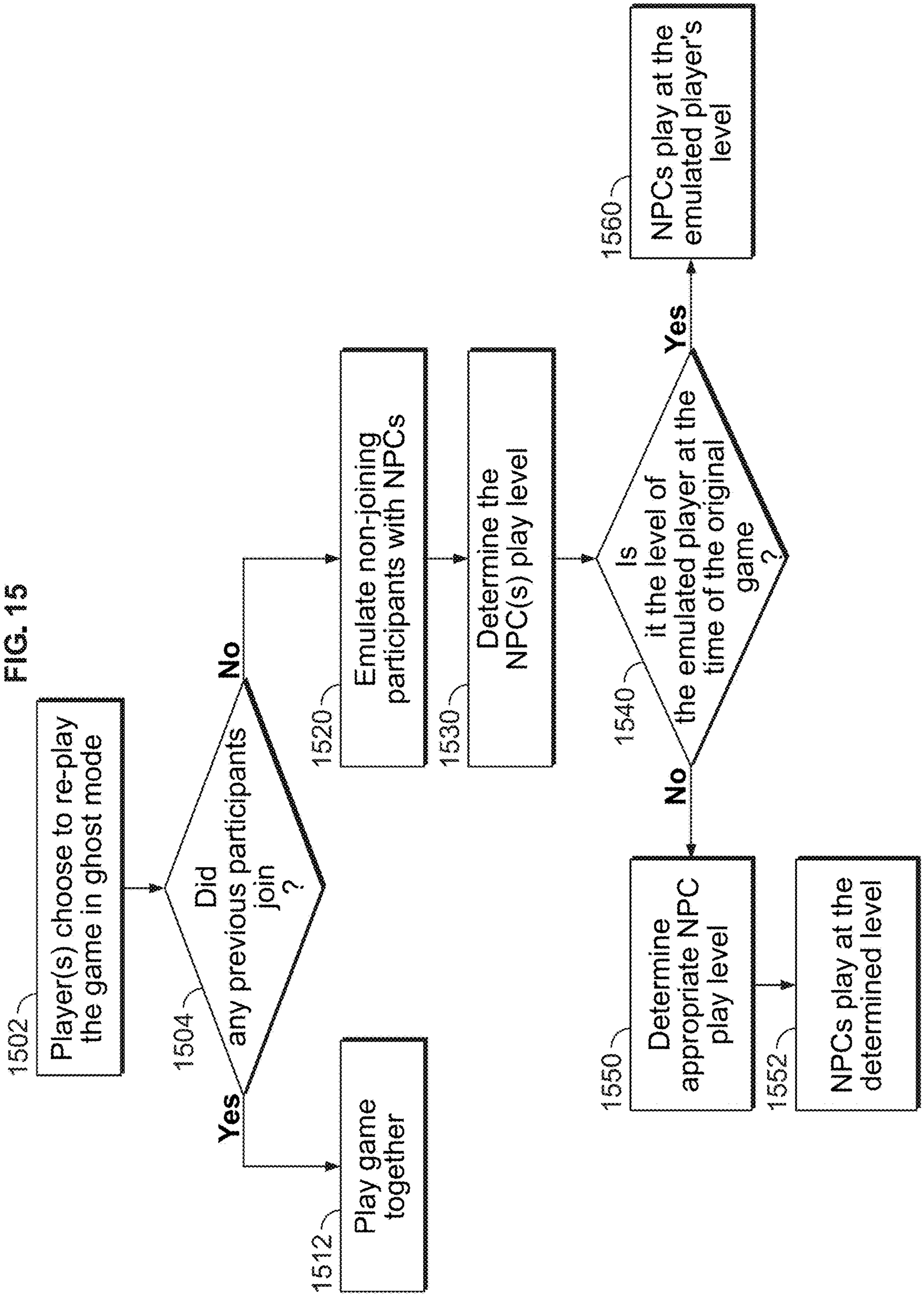
FIG. 15 depicts an illustrative flowchart of a process for re-playing game sessions, in accordance with some examples of the disclosure.

FIG. 15 depicts an illustrative flowchart of a process for re-playing game sessions, in accordance with some examples of the disclosure. In some examples, when a player or players chooses to re-play a game in ghost mode, an invitation may be sent out to all the previous participants to join again and play together. Those who do not join may be emulated by NPCs as described in some examples. Depending on the replay, the NPC(s) play level could be the level of the emulated player at the time when the original game when it was played.

Process 1500 may be implemented, in whole or in part, by system 121 shown in FIG. 3. One or more actions of process 1500 may be incorporated into or combined with one or more actions of any other process or embodiments described herein. Process 1500 may be saved to a memory or storage (such as any one or more of those shown in FIGS. 1A-1C and 3) as one or more instructions or routines that may be executed by a corresponding device or system to implement process 1500.

Accordingly, at step 1502 of process 1500, player(s) choose to replay the game in "ghost mode". At step 1504, it is determined if any other participants joined the replay. If the answer to step 1504 is yes, process 1500 continues on to step 1512. If the answer to step 1504 is no, process 1500 continues on to step 1520. At step 1512, the players game the game together.

At step 1520, the system emulates non-joining participants as NPCs (proxy users). At step 1530, the NPC(s) skill level and play styles are determined. At step 1540, it is determined if the currently selected still level of the emulated players is the same at the time of the game session selected for replay. If the answer to step 1540 is no, process 1500 continues on to step 1550. If the answer to step 1540 is yes, process 1500 continues on to step 1560.

At step 1550, an appropriate play level and style for the NPCs is determined and selected. At step 1552, the NPCs are updated to play at the determined and selected play level and style. At step 1560 the NPCs play at the original selected level. Process 1500 may be incorporated into other processes herein, such as processes 500 to 1400. Alternatively, process 1500 may be carried out in parallel to the processes herein, such as, again, processes 500 to 1400.

Figure 16:
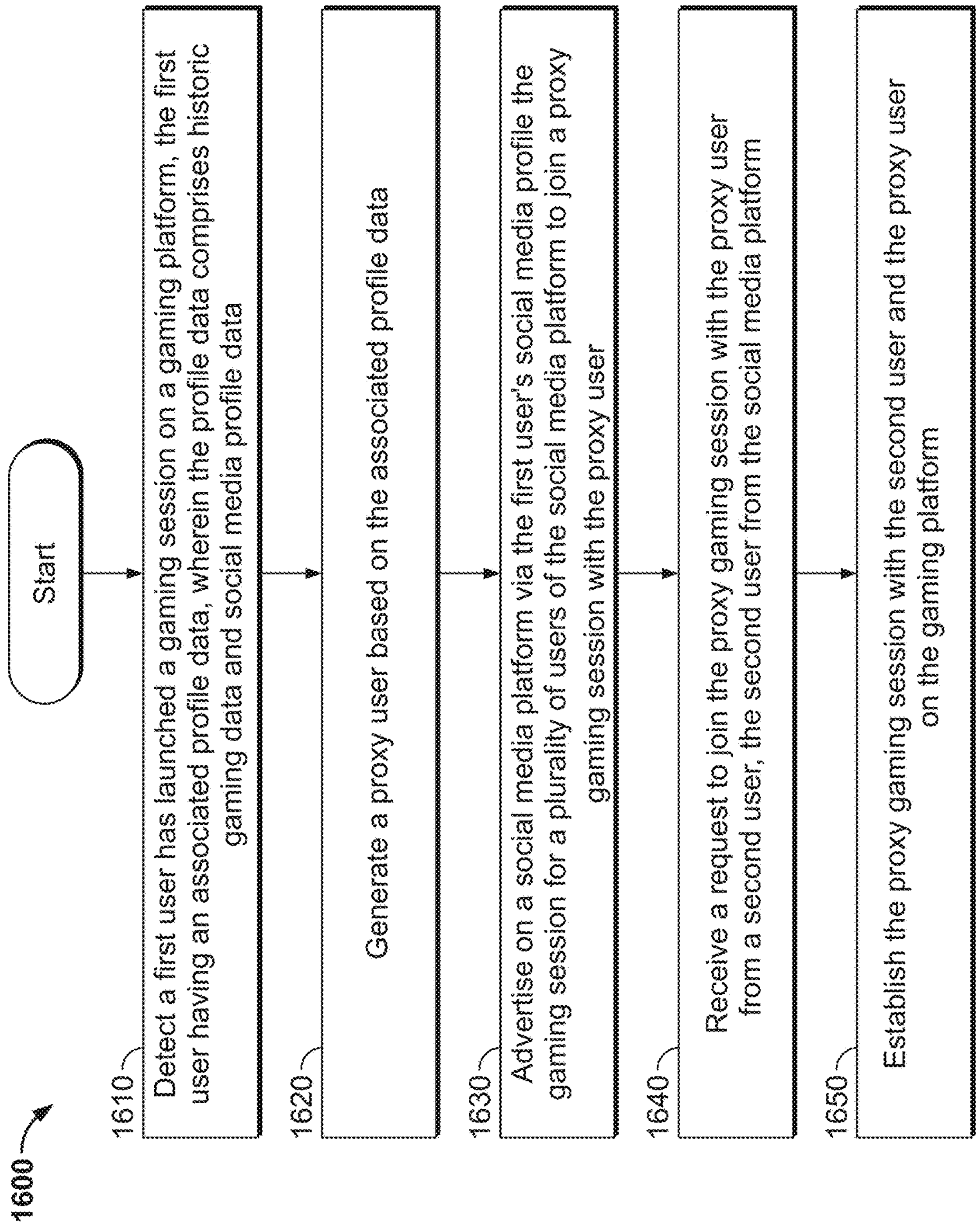
FIG. 16 illustrates an exemplary media transmission device, in accordance with some embodiments of the disclosure.

FIG. 16 depicts an illustrative flowchart of a process for establishing gaming sessions, in accordance with some examples of the disclosure. Process 1600 may be incorporated into other processes herein. Alternatively, process 1600 may be carried out in parallel to the processes herein.

Process 1600 may be implemented, in whole or in part, by system 121 shown in FIG. 3. One or more actions of process 1600 may be incorporated into or combined with one or more actions of any other process or embodiments described herein. Process 1600 may be saved to a memory or storage (such as any one or more of those shown in FIGS. 1A-1C and 3) as one or more instructions or routines that may be executed by a corresponding device or system to implement process 1600.

Process 1600 starts at step 1610. At step 1610, the system detects a first user has launched a gaming session on a gaming platform, the first user having an associated profile data, wherein the profile data comprises historic gaming data and social media profile data.

At step 1620, the system generates a proxy user based on the associated profile data. In some examples, the proxy user is generated with a reinforcement learning algorithm.

At step 1630, the system advertises on a social media platform via the first user's social media profile the gaming session for a plurality of users of the social media platform to join a proxy gaming session with the proxy user.

At step 1640, the system receives a request to join the proxy gaming session with the proxy user from a second user, the second user from the social media platform.

At step 1650, the system establishes the proxy gaming session with the second user and the proxy user on the gaming platform.

This method provides integration between a gaming platform and social media platform (optionally via an intermediary cloud-based system) to provide a dynamic, interactive, and personalized gaming experience that values social integration, and replayability. This disclosure also extends social media's role beyond simple browser-embedded games. This method and proposed systems use social media as a tool for organizing and initiating gaming sessions on gaming consoles, mobile devices, virtual machines and PCs, for example. This offers gamers a seamless integration of their gaming and social experiences, maintaining the depth of console and PC-based games while facilitating social interaction and coordination through popular social media platforms.

Additionally, this method allows for initiating gaming sessions with proxy non-player characters through a social media platform. In this way, when the game is shared and many players want to play with or against the first user, an accurate proxy user can be generated that mimics the first user. The social sharing/viral aspects of this method enables the training of these player models which has not been possible prior to the present disclosure, as the proxy user can be repetitively trained through the plurality of users playing with or against the proxy user. This results in a proxy user that behaves similarly to the real player. This provides more personalized and immersive experience for other players.

Figure 17:
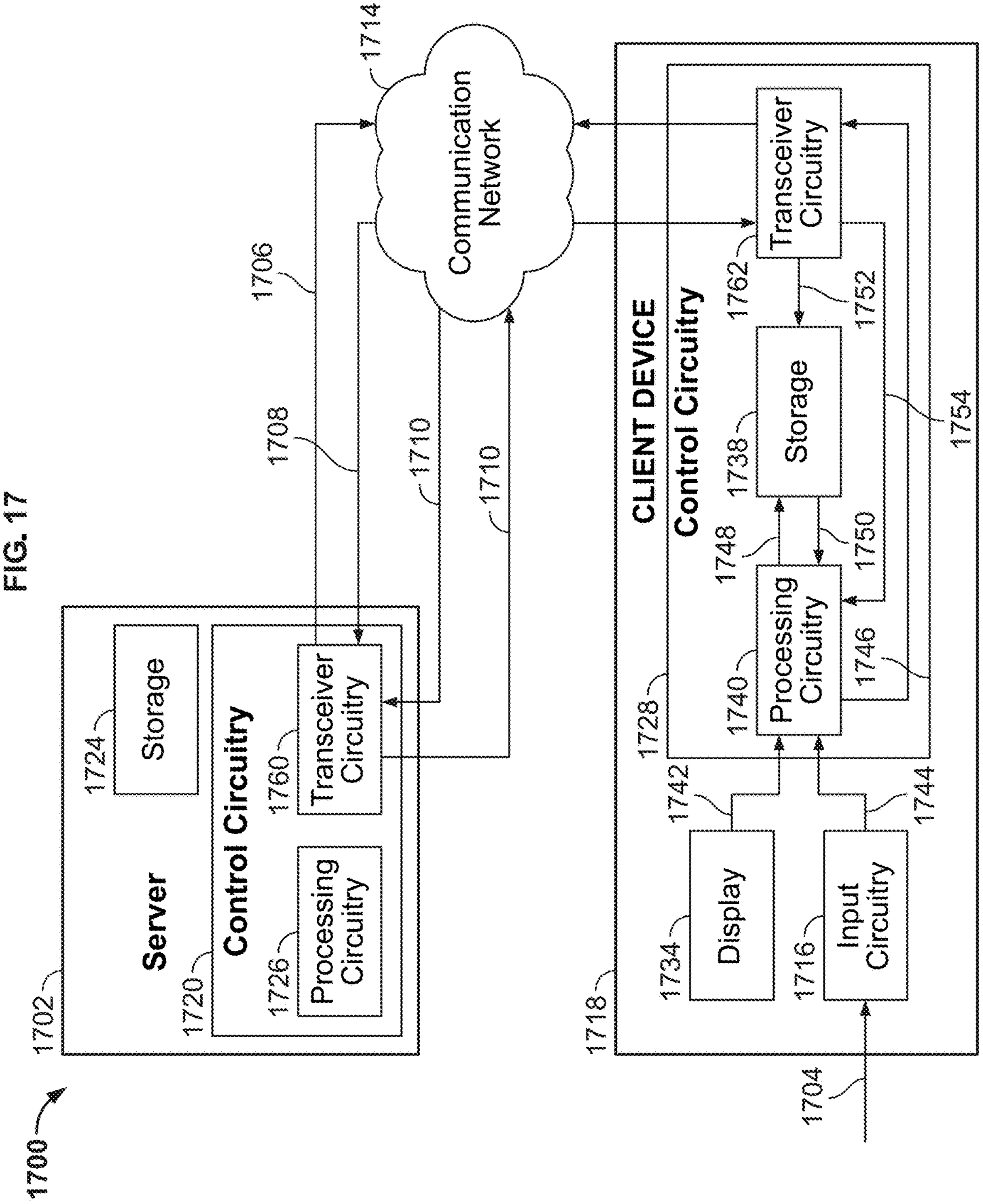
FIG. 17 is a block diagram representing devices, components of each device, and data flow therebetween for an adaptive video streaming system, in accordance with some embodiments of the disclosure.

FIG. 17 is a block diagram representing devices, components of each device, and data flow therebetween for an adaptive video streaming system, in accordance with some embodiments of the disclosure. System 1700 is shown to include a client device 1718, a server 1702, and a communication network 1714. It is understood that while a single instance of a component may be shown and described relative to FIG. 17, additional instances of the component may be employed. For example, server 1702 may include or may be incorporated in, more than one server. Similarly, communication network 1714 may include or may be incorporated in, more than one communication network. Server 1702 is shown communicatively coupled to client device 1718 through communication network 1714. While not shown in FIG. 17, server 1702 may be directly communicatively coupled to client device 1718, for example, in a system absent or bypassing communication network 1714.

In some examples, the notification is selectable and comprises information regarding the streaming of media content on a user device or a network device. For example, a user device or a network device (e.g., a laptop, PC, smartphone, smart TV, or the like) may be notified by a media server as a reminder to stream media content and, after the user interacts with the notification, the user may be able to consume media content on the user device, or schedule in a time to consume media content on the user device in the user's calendar. In some examples, the media content is an adaptive bitrate stream compatible with the MPEG-DASH standard, or other implementations such as Apple HLS. In some examples, the media content is encoded using an adaptive bitrate streaming compatible codec. There are numerous examples of video codecs that are adaptive bitrate streaming compatible (e.g., x264, OpenH264, H.264/MPEG-4 AVC, which are all codecs compatible with the video format H.264). Moreover, there are numerous examples of video formats (e.g., H.264, H.265, VP9, AV1), each of which has numerous examples of video codecs.

Communication network 1714 may comprise one or more network systems, such as, without limitation, an internet, LAN, WIFI, or other network systems suitable for audio processing applications. In some embodiments, system 1700 excludes server 1702, and functionality that would otherwise be implemented by server 1702 is instead implemented by other components of system 1700, such as one or more components of communication network 1714. In still other embodiments, server 1702 works in conjunction with one or more components of communication network 1714 to implement certain functionality described herein in a distributed or cooperative manner. Similarly, in some embodiments, system 1700 excludes client device 1718, and functionality that would otherwise be implemented by the client device 1718 is instead implemented by other components of system 1700, such as one or more components of communication network 1714 or server 1702 or a combination. In still other embodiments, the client device 1718 works in conjunction with one or more components of communication network 1714 or server 1702 to implement certain functionality described herein in a distributed or cooperative manner.

The client device 1718 includes control circuitry 1728, display 1734, and input-output circuitry 1716. Control circuitry 1728 in turn includes transceiver circuitry 1762, storage 1738, and processing circuitry 1740. In some embodiments, client device 1718 or control circuitry 1728 may be configured as user device 1735 of FIG. 17.

Server 1702 includes control circuitry 1720 and storage 1724. Each of the storages 1724 and 1738 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Each storage 1724, 1738 may be used to store various types of content, media data, and or other types of data (e.g., they can be used to store media content such as audio, video, and advertisement data). The non-volatile memory may also be used (e.g., to launch a boot-up routine and other instructions). Cloud-based storage may be used to supplement storages 1724,

1738 or instead of storages 1724, 1738. In some embodiments, the pre-encoded or encoded media content, in accordance with the present disclosure, may be stored on one or more of storages 1724, 1738.

In some embodiments, control circuitry 1720 and/or 1728 executes instructions for an application stored on the memory (e.g., storage 1724 and/or storage 1738). Specifically, control circuitry 1720 and/or 1728 may be instructed by the application to perform the functions discussed herein. In some implementations, any action performed by control circuitry 1720 and/or 1728 may be based on instructions received from the application. For example, the application may be implemented as software or a set of executable instructions that may be stored on storage 1724 and/or 1738 and executed by control circuitry 1720 and/or 1728. In some embodiments, the application may be a client/server application where only a client application resides on client device 1718, and a server application resides on server 1702.

The application may be implemented using any suitable architecture. For example, it may be a stand-alone application wholly implemented on client device 1718. In such an approach, instructions for the application are stored locally (e.g., in storage 1738), and data for use by the application is downloaded periodically (e.g., from an out-of-band feed, from an internet resource, or using another suitable approach). Control circuitry 1728 may retrieve instructions for the application from storage 1738 and process the instructions to perform the functionality described herein. Based on the processed instructions, control circuitry 1728 may determine a type of action to perform in response to input received from the input/output path (or input-output circuitry) 1716 or the communication network 1714. For example, in response to a receiving a notification on the client device 1718, control circuitry 1728 may perform the steps of processes relative to various embodiments discussed herein.

In client/server-based embodiments, control circuitry 1728 may include communication circuitry suitable for communicating with an application server (e.g., server 1702) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 1714). In another example of a client/server-based application, control circuitry 1728 runs a web browser that interprets web pages provided by a remote server (e.g., server 1702). For example, the remote server may store the instructions for the application in a storage device. The remote server may process the stored instructions using circuitry (e.g., control circuitry 1728) and/or generate displays. Client device 1718 may receive the displays generated by the remote server and may display the content of the displays locally via display 1734. This way, the processing of the instructions is performed remotely (e.g., by server 1702) while the resulting displays, such as the display windows described elsewhere herein, are provided locally on the client device 1718. Client device 1718 may receive inputs from the user via input circuitry 1716 and transmit those inputs to the remote server for processing and generating the corresponding displays. Alternatively, client device 1718 may receive inputs from the user via input circuitry 1716 and process and display the received inputs locally, by control circuitry 1728 and display 1734, respectively.

Server 1702 and client device 1718 may transmit and receive content and data such as media content via communication network 1714. For example, server 1702 may be a media content provider, and client device 1718 may be a smart television configured to download or stream media content, such as a YouTube video, from server 1702. Control circuitry 1720, 1728 may send and receive commands, requests, and other suitable data through communication network 1714 using transceiver circuitry 1760, 1762, respectively. Control circuitry 1720, 1728 may communicate directly with each other using transceiver circuitry 1760, 1762, respectively, avoiding communication network 1714.

It is understood that client device 1718 is not limited to the embodiments and methods shown and described herein. In non-limiting examples, the client device 1718 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, client equipment, or wireless device, and/or combination of the same capable of suitably displaying and manipulating media content.

Control circuitry 1720 and/or 1718 may be based on any suitable processing circuitry such as processing circuitry 1726 and/or 1740, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 1720 and/or control circuitry 1718 are configured to implement a media content operation system, such as systems, or parts thereof, that perform various media content manipulation processes described herein.

Client device 1718 receives a user input 1704 at input circuitry 1716. For example, client device 1718 may receive a user input like a user swipe or user touch, as previously discussed. In some embodiments, client device 1718 is a media device (or player), with the capability to access media content. It is understood that client device 1718 is not limited to the embodiments and methods shown and described herein. In non-limiting examples, the client device 1718 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

User input 1704 may be received from a user selection-capturing interface that is separate from device 1718, such as a remote-control device, trackpad, or any other suitable user movement sensitive or capture devices, or as part of device 1718, such as a touchscreen of display 1734. Transmission of user input 1704 to client device 1718 may be accomplished using a wired connection, such as an audio cable, USB cable, ethernet cable, or the like attached to a corresponding input port at a local device, or may be accomplished using a wireless connection, such as BLUETOOTH, Wi-Fi, WiMAX, ZIGBEE, GSM, UTMS, CDMA, TDMA, 3G, 4G, 4G LTE, or any other suitable wireless transmission protocol. Input circuitry 1716 may comprise a physical input port such as a 3.5 mm audio jack, RCA audio jack, USB port, ethernet port, or any other suitable connection for receiving audio over a wired connection, or may comprise a wireless receiver configured to receive data via BLUETOOTH, Wi-Fi, WiMAX, ZIGBEE, GSM, UTMS, CDMA, TDMA, 3G, 4G, 4G LTE, or other wireless transmission protocols.

Processing circuitry 1740 may receive input 1704 from input circuit 1716. Processing circuitry 1740 may convert or translate the received user input 1704 that may be in the form of gestures or movement to digital signals. In some embodiments, input circuit 1716 performs the translation to digital signals. In some embodiments, processing circuitry 1740 (or processing circuitry 1726, as the case may be) carries out disclosed processes and methods.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods. In this specification, the following terms may be understood given the below explanations:

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent or similar purpose unless expressly stated otherwise. Thus, unless expressly stated otherwise, each feature disclosed is one example only of a generic series of equivalent or similar features.

The invention(s) are not restricted to the details of any foregoing embodiments. The invention(s) extend to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

All of the features disclosed in this specification (including any accompanying claims, abstract, and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method for replaying past gaming sessions on a gaming platform, the method comprising:
- receiving a request to replay a past gaming session from a first user account;
- accessing a participant list related to the past gaming session;
- causing to transmit to a plurality of user accounts associated with the participant list respective selectable invitations to a proxy gaming session;
- based at least in part on a rejection of at least one of the selectable invitations to the proxy gaming session, generating a plurality of proxy user accounts based at least in part on associated profile data for each user account of the plurality of user accounts, wherein the associated profile data comprises historic gaming data; and
- establishing the proxy gaming session with the first user account and the plurality of proxy user accounts on the gaming platform.

2. The method of claim 1, wherein the plurality of proxy user accounts is generated using a reinforcement learning algorithm based at least in part on the historic gaming data.

3. The method of claim 1, further comprising generating a proxy gaming profile for a proxy user account of the plurality of proxy user accounts.

4. The method of claim 1, wherein the associated profile data for each user account of the plurality of user accounts further comprises social media profile data, the method further comprising:

causing to prompt the first user account to request to replay the past gaming session via a post on a social media platform.

5. The method of claim 4, further comprising:

causing to output an advertisement of the proxy gaming session on the social media platform, for a plurality of users of the social media platform, via a social media profile of the first user account, wherein the advertisement comprises information associated with the past gaming session.

6. The method of claim 5, wherein the advertisement of the proxy gaming session on the social media platform via the social media profile of the first user account comprises metadata required to participate in the proxy gaming session, the metadata comprising at least one of: a game title, save game data, purchased game data, required game platform hardware, or a gaming engine.

7. The method of claim 5, further comprising:

receiving a request to join the proxy gaming session from a second user account associated with the social media platform.

8. The method of claim 7, wherein the request to join the proxy gaming session from the second user account is received after the proxy gaming session has started, the method further comprising:

substituting the second user account for a proxy user account in the proxy gaming session.

9. The method of claim 7, further comprising:

causing to output a request for feedback, from the first user account, on a performance of at least one of the proxy user accounts in the proxy gaming session; and receiving the feedback on the performance of the at least one of the proxy user accounts from the second user account.

10. The method of claim 9, further comprising:

based at least in part on the feedback of the performance of the at least one proxy user account, adjusting a difficulty level of the proxy gaming profile of the at least one proxy user account.

11. The method of claim 10, wherein the adjusting of the difficulty level of the gaming profile of the at least one proxy user account improves at least one of: accuracy, decision making speed, or reaction time, of the at least one proxy user account.

12. The method of claim 10, wherein the adjusting of the difficulty level of the gaming profile of the at least one proxy user account does not change at least one of: playstyle, weapon choice, or strategy choice, of the at least one proxy user account.

13. The method of claim 4, further comprising:

causing to display gaming profile data on the social media platform, the gaming profile data comprising at least one of: a skill level, game statistics, a quantity of hours played, a platform of choice, a kill-to-death ratio, a character choice, or a play style for the first user account.

14. The method of claim 4, further comprising:

extracting social media data from each user account of the plurality of user accounts of the social media platform, the social media data comprising at least one of: a verification badge, a follower count, a like count, a comment, a sharing feature, or a profile picture;

transmitting the social media data to the gaming platform; and causing to display the social media data on the gaming platform for the first user account.

15. The method of claim 1, further comprising:

causing to output information associated with a participation reward to the first user account, wherein the participation reward comprises at least one of: badges, health, skins, game items, game currency, or XP boosts.

16. The method of claim 1, further comprising:

generating, with a natural language model, real-time gameplay commentary during the proxy gaming session;

generating, with a custom voice model, a sound clip based at least in part on the real-time gameplay commentary; and transmitting, from a proxy user account of the plurality of proxy user accounts, the sound clip during the proxy gaming session.

17. The method of claim 16, wherein the real-time gameplay commentary comprises at least one of: a play style of the first user account, a skill level of a user account of the plurality of user accounts, game statistics of the proxy gaming session, a kill-to-death ratio of a second user account, the kill-to-death ratio of the proxy user account of the plurality of proxy user accounts, a character choice of a proxy user account of the plurality of proxy user accounts, an insult, a compliment, a joke, or one or more strategies for playing with the proxy user profile.

18. The method of claim 1, further comprising:

receiving a request to join the proxy gaming session from a third user account; and establishing a second proxy gaming session, in parallel to the proxy gaming session, with the third user account and the proxy user accounts on the gaming platform.

19. The method of claim 1, wherein the plurality of proxy user accounts is generated before a start of the proxy gaming session.

20. A system for replaying past gaming sessions on a gaming platform, the system comprising: data storage and processing circuitry, the processing circuitry configured to execute computer-readable instructions that configure the computing system to:

receive a request to replay a past gaming session from a first user account;

access a participant list related to the past gaming session;

transmit to a plurality of user accounts associated with the participant list respective selectable invitations to a proxy gaming session;

based at least in part on a rejection of at least one of the selectable invitations to the proxy gaming session, generate a plurality of proxy user accounts based at least in part on associated profile data for each user account of the plurality of user accounts, wherein the associated profile data comprises historic gaming data; and establish the proxy gaming session with the first user account and the plurality of proxy user accounts on the gaming platform.

* * * * *